(12) United States Patent
Meeds et al.

(10) Patent No.: US 11,030,275 B2
(45) Date of Patent: Jun. 8, 2021

(54) MODELLING ORDINARY DIFFERENTIAL EQUATIONS USING A VARIATIONAL AUTO ENCODER

(71) Applicant: Microsoft Technology Licensing, LLC, Redmond, WA (US)

(72) Inventors: Edward Meeds, Cambridge (GB); Geoffrey Roeder, Princeton, NJ (US); Neil Dalchau, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 16/255,778

(22) Filed: Jan. 23, 2019

(65) Prior Publication Data
US 2020/0233920 A1 Jul. 23, 2020

(30) Foreign Application Priority Data
Jan. 18, 2019 (GB) ..................................... 1900742

(51) Int. Cl.
*G06F 17/13* (2006.01)
*G06N 3/04* (2006.01)
*G06N 3/08* (2006.01)
*G06K 9/62* (2006.01)

(52) U.S. Cl.
CPC ........... *G06F 17/13* (2013.01); *G06K 9/6256* (2013.01); *G06K 9/6269* (2013.01); *G06N 3/0454* (2013.01); *G06N 3/08* (2013.01)

(58) Field of Classification Search
CPC .................................. G06F 7/13; G06F 17/13
See application file for complete search history.

(56) References Cited

U.S. PATENT DOCUMENTS

| 2017/0147742 A1 | 5/2017 | Jayaraman et al. | |
| 2018/0247200 A1* | 8/2018 | Rolfe | .................... G06N 3/0454 |
| 2018/0367192 A1* | 12/2018 | O'Shea | ................ G06N 3/0445 |
| 2020/0005890 A1 | 1/2020 | Dalchau et al. | |

OTHER PUBLICATIONS

Ling, et al., "Novel Recurrent Neural Network for Modelling Biological Networks: Oscillatory p53 Interaction Dynamics", In Journal of Biosystems, vol. 114, Issue 3, Dec. 2013, 3 Pages.

(Continued)

*Primary Examiner* — Chuong D Ngo

(57) ABSTRACT

A computer-implemented method comprising: from each of multiple trials, obtaining a respective series of observations y(t) of a subject over time t; using a variational auto encoder to model an ordinary differential equation, ODE, wherein the variational auto encoder comprises an encoder for encoding the observations into a latent vector z and a decoder for decoding the latent vector, the encoder comprising a first neural network and the decoder comprising one or more second neural networks, wherein the ODE as modelled by the decoder has a state x(t) representing one or more physical properties of the subject which result in the observations y, and the decoder models a rate of change of x with respect to time t as a function f of at least x and z: dx/dt=f(x, z); and operating the variational auto encoder to learn the function f based on the obtained observations y.

20 Claims, 14 Drawing Sheets

(56) References Cited

OTHER PUBLICATIONS

Liu, et al., "Mechanism of the Quorum-Quenching Lactonase (AiiA) from Bacillus thuringiensis. 1. Product-Bound Structures", In Journal of Biochemistry, vol. 47, Issue 29, Jul. 15, 2008, pp. 7706-7714.

Llorens, et al., "Stationary Phase in Gram-negative Bacteria", In Journal of FEMS Microbiology Reviews, vol. 34, Issue 4, Jul. 1, 2010, pp. 476-495.

Lu, et al., "High-Dimensional ODEs Coupled with Mixed-Effects Modeling Techniques for Dynamic Gene Regulatory Network Identification", In Journal of the American Statistical Association, vol. 106, Issue 496, Dec. 2011, 29 Pages.

MacDonald, Benn, "Statistical Inference for Ordinary Differential Equations using Gradient Matching", In Thesis Submitted for Doctor of Philosophy, School of Mathematics and Statistics, University of Glasgow, Feb. 3, 2017, 232 Pages.

Mandt, et al., "Stochastic Gradient Descent as Approximate Bayesian Inference", In Journal of Machine Learning Research, vol. 18, Issue 1, Dec. 2017, 35 Pages.

Marin, et al., "Relevant Statistics for Bayesian Model Choice", In Journal of the Royal Statistical Society, vol. 76, Issue 5, Aug. 22, 2013, 30 Pages.

Mikkelsen, et al., "Learning Large Scale Ordinary Differential Equation Systems", Retrieved from: <<https://arxiv.org/pdf/1710.09308.pdf>>, Oct. 26, 2017, 55 Pages.

Moore, et al., "Rapid Acquisition and Model-based Analysis of Cell-free Transcription—Translation Reactions from Nonmodel Bacteria", In Proceedings of the National Academy of Sciences, vol. 115, Issue 19, Apr. 17, 2018, pp. E4340-E4349.

Moreno, et al., "Automatic Variational ABC", Retrieved from: <<https://arxiv.org/pdf/1606.08549.pdf>>, Jun. 28, 2016, 11 Pages.

Murray, James D., "Mathematical Biology: I. An Introduction", In Publication of Springer, Interdisciplinary Applied Mathematics, vol. 17, 2007, 576 Pages.

Nelder, et al., "A Simplex Method for Function Minimization", In Computer Journal, vol. 7, Issue 4, Jan. 1, 1965, pp. 308-313.

Nielsen, et al., "Genetic Circuit Design Automation", In Journal of Science, vol. 352, Issue 6281, Apr. 1, 2016, 13 Pages.

Noble, Denis, "A Modification of the Hodgkin-Huxley Equations Applicable to Purkinje Fibre Action and Pacemaker Potentials", In Journal of Physiology, vol. 160, Issue 2, Feb. 1, 1962, pp. 317-352.

Noble, Denis, "Modeling the Heart—from Genes to Cells to the Whole Organ", In Journal of Science, vol. 295, Issue 5560, Mar. 1, 2002, pp. 1678-1682.

Nystrom, et al., "A Dynamic Model of Resource Allocation in Response to the Presence of a Synthetic Construct", In Journal of American Chemical Society Synthetic Biology, vol. 7, Issue 5, Apr. 24, 2018, pp. 1201-1210.

Pasotti, et al., "Re-using Biological Devices a Model-aided Analysis of Interconnected Transcriptional Cascades Designed from the Bottom-up", In Journal of Biological Engineering, vol. 11, Issue 50, Dec. 14, 2017, 19 Pages.

Pinheiro, et al., "nlme: Linear and Nonlinear Mixed Effects Models", Retrieved from: <<https://cran.r-project.org/web/packages/nlme/nlme.pdf>>, Apr. 7, 2018, 336 Pages.

Pontryagin, Lev Semenovich, "Mathematical Theory of Optimal Processes", In Publication of CRC Press, Taylor and Francis Group, vol. 4, 1962, 360 Pages.

Qian, et al., "Resource Competition Shapes the Response of Genetic Circuits", In Journal of American Chemical Society, vol. 6, Issue 7, Apr. 3, 2017, 13 Pages.

Quach, et al., "Estimating Parameters and Hidden Variables in Non-linear State-space Models based on ODEs for Biological Networks Inference", In Journal of Bioinformatics, vol. 23, Issue 23, Dec. 1, 2007, pp. 3209-3216.

Rainforth, et al., "Tighter Variational bounds are Not Necessarily Better", In Proceedings of the 35th International Conference on Machine Learning, Jun. 25, 2018, 15 Pages.

Raissi, et al., "Machine Learning of Linear Differential Equations using Gaussian Processes", In Journal of Computational Physics, vol. 348, Nov. 1, 2017, pp. 683-693.

Ranganath, et al., "Hierarchical Variational Models", In Proceedings of the 33rd International Conference on Machine Learning, Jun. 11, 2016, 10 Pages.

Ruder, "Synthetic Biology Moving into the Clinic", In Journal of Science, vol. 333, Issue 6047, Sep. 2, 2011, pp. 1248-1252.

Rudge, et al., "Characterization of Intrinsic Properties of Promoters", In Journal of American Chemical Society Synthetic Biology, vol. 5, Issue 1, Oct. 5, 2015, pp. 89-98.

Ryder, et al., "Black-box Variational Inference for Stochastic Differential Equations", In Proceedings of the 35th International Conference on Machine Learning, May 14, 2018, 10 Pages.

Samarasinghe, Sandhya, et al., "A System of Recurrent Neural Networks for Modularising, Parameterising and Dynamic Analysis of Cell Signalling Networks", In Journal of Biosystems, vols. 153-154, Issue 6-25, Feb. 4, 2017, 2 Pages.

Schuster, et al., "Promoter Specificity in Pseudomonas aeruginosa Quorum Sensing revealed by DNA Binding of Purified LasR", In Proceedings of the National Academy of Sciences, vol. 101, Issue 45, Oct. 25, 2004, pp. 15833-15839.

Scott, et al., "Interdependence of Cell Growth and Gene Expression: Origins and Consequences", In Journal of Science, vol. 330, Issue 6007, Nov. 19, 2010, pp. 1099-1102.

Sheiner, et al., "Estimation of Population Characteristics of Pharmacokinetic Parameters from Routine Clinical Data", In Journal of Pharmacokinetics and Biopharmaceutics, vol. 5, Issue 5, Oct. 1977, pp. 445-479.

Sisson, et al., "Sequential Monte Carlo without Likelihoods", In Proceedings of the National Academy of Sciences, vol. 104, Issue 6, Feb. 6, 2007, pp. 1760-1765.

Smith, et al., "Signal Discrimination by Differential Regulation of Protein Stability in Quorum Sensing", In Journal of Molecular Biology, vol. 382, Issue 5, Oct. 24, 2008, 15 Pages.

Sohn, et al., "Learning Structured Output Representation using Deep Conditional Generative Models", In Proceedings of Advances in Neural Information Processing Systems, 2015, 9 Pages.

Stevens, et al., "Quorum Sensing in Vibrio fischeri: Essential Elements for Activation of the Luminescence Genes", In Journal of Journal of Bacteriology, vol. 179, Issue 2, Jan. 1, 1997, pp. 557-562.

Tan, et al. "Emergent Bistability by a Growth-modulating Positive Feedback Circuit", In Journal of Nature Chemical Biology, vol. 5, Issue 11, Nov. 2009, 18 Pages.

Toni, et al., "Combined Model of Intrinsic and Extrinsic Variability for Computational Network Design with Application to Synthetic Biology", In Journal of PLoS Computational Biology, vol. 9, Issue 3, Mar. 28, 2013, 18 Pages.

Toni, et al., "Approximate Bayesian Computation Scheme for Parameter Inference and Model Selection in Dynamical Systems", In Journal of the Royal Society Interface, vol. 6, Issue 31, Jul. 9, 2009, pp. 187-202.

Tornoe, et al., "Non-linear Mixed-effects Pharmacokinetic/Pharmacodynamic Modelling in NLME using Differential Equations", In Journal of Computer Methods and Programs in Biomedicine, vol. 76, Issue 1, Oct. 1, 2014, pp. 31-40.

Tran, et al., "Hierarchical Implicit Models and Likelihood-free Variational Inference", In Proceedings of Advances in Neural Information Processing Systems, 2017, 11 Pages.

Trottier, et al., "Synchronous Long-term Oscillations in a Synthetic Gene Circuit", In Journal of Nature, vol. 538, Issue 7626, Oct. 27, 2016, pp. 514-517.

Tucker, et al., "Doubly Reparameterized Gradient Estimators for Monte Carlo Objectives", Retrieved from: <<https://arxiv.org/pdf/1810.04152.pdf>>, Nov. 19, 2018, 14 Pages.

Tyson, et al., "Network Dynamics and Cell Physiology", In Journal of Nature Reviews Molecular Cell Biology, vol. 2, Issue 12, Dec. 2001, pp. 908-916.

Ainsworth, et al., "Interpretable VAEs for Nonlinear Group Factor Analysis", Retrieved from:<<https://arxiv.org/pdf/1802.06765.pdf>>, Feb. 17, 2018, 20 Pages.

Aldridge, et al., "Physicochemical Modelling of Cell Signaling Pathways", In Journal of Nature Cell Biology, vol. 8, Issue 11, Nov. 2006, 10 Pages.

(56) References Cited

OTHER PUBLICATIONS

Yordanov, et al., "A Computational Method for Automated Characterization of Genetic Components", In Journal of American Chemical Society Synthetic Biology, vol. 3, Issue 8, Feb. 20, 2014, pp. 578-588.
Archer, et al., "Black Box Variational Inference for State Space Models", Retrieved from: <<https://arxiv.org/pdf/1511.07367.pdf>>, Nov. 23, 2015, 11 Pages.
Balagadde, et al., "A Synthetic *Escherichia coli* Predator-prey Ecosystem", In Journal of Molecular systems Biology, vol. 4, Issue 187, Mar. 1, 2008, 8 Pages.
Beal, et al., "NONMEM Users Guides", In Introductory Guide of NONMEM Project Group, Apr. 2011, 169 Pages.
Bombarelli, Rafael Gomez., et al., "Automatic Chemical Design using a Data-Driven Continuous Representation of Molecules", In Journal of American Chemical Society Central Science, vol. 4, Issue 2, Jan. 12, 2018, pp. 268-276.
Bouvet, et al., "Control of RNase E-mediated RNA Degradation by 5-Terminal Base Pairing in *E. coli*", In Journal of Nature, vol. 360, Issue 6403, Dec. 3, 1992, pp. 488-491.
Box, George E.P., "Science and Statistics", In Journal of the American Statistical Association, vol. 71, Issue 356, Dec. 1976, 10 Pages.
Brophy, et al., "Principles of Genetic Circuit Design", Retrieved from: <<https://www.ncbi.nlm.nih.gov/pmc/articles/PMC4230274/>>, Apr. 29, 2014, 30 Pages.
Brown, James Robert, "A Design Framework for Self-organised Turing Patterns in Microbial Populations", In PhD Thesis, University of Cambridge, Sep. 2011, 193 Pages.
Calderhead, et al., "Statistical Analysis of Nonlinear Dynamical Systems using Differential Geometric Sampling Methods", In Journal of Interface Focus, vol. 1, Aug. 24, 2011, pp. 821-835.
Calderhead, Ben, et al., "Estimating Bayes Factors via Thermodynamic Integration and Population MCMC", In Journal of Computational Statistics and Data Analysis, vol. 53, Issue 12, Jul. 28, 2009, 33 Pages.
Carey, et al., "Mixed-Effects Models in S and S-Plus", In Journal of the American Statistical Association, vol. 96, Dec. 31, 2011, 3 Pages.
Ceroni, et al., "Quantifying Cellular Capacity Identifies Gene Expression Designs with Reduced Burden", In Journal of Nature Methods, vol. 12, Issue 5, Apr. 6, 2015, 39 Pages.
Chen, Ye, et al., "Emergent Genetic Oscillations in a Synthetic Microbial Consortium", Retrieved from:<<https://www.ncbi.nlm.nih.gov/pmc/articles/PMC4597888/pdf/nihms-726415.pdf>>, Aug. 28, 2015, 11 Pages.
Chen, et al., "Neural Ordinary Differential Equations", Retrieved from: <<https://arxiv.org/pdf/1806.07366v1.pdf>>, Jun. 2018, 19 Pages.
Church, et al., "Realizing the Potential of Synthetic Biology", In Journal of Nature Reviews, Molecular Cell Biology, vol. 15, Apr. 2014, pp. 289-294.
Woods, et al., "A Statistical Approach Reveals Designs for the Most Robust Stochastic Gene Oscillators", In Journal of ACS Synthetic Biology, vol. 5, Issue 6, Feb. 17, 2016, pp. 459-470.
Wang, et al., "Estimating Mixed-effects Differential Equation Models", In Journal of Statistics and Computing, vol. 24, Issue 1, Jan. 2014, 30 Pages.
Daniel, et al., "Synthetic Analog Computation in Living Cells", In Journal of Nature, vol. 497, Issue 7451, May 30, 2013, pp. 619-624.
Danino, et al., "A Synchronized Quorum of Genetic Clocks", Retrieved from: <<https://www.ncbi.nlm.nih.gov/pubmed/20090747>>, Jan. 21, 2010, 14 Pages.
Der, Bryan S., et al., "DNAplotib: Programmable Visualization of Genetic Designs and Associated Data", In Journal of ACS Synthetic Biology, Oct. 19, 2016, 18 Pages.
Dondelinger, et al., "Ode Parameter Inference Using Adaptive Gradient Matching with Gaussian Processes", In Proceedings of the 16th International Conference on Artificial Intelligence and Statistics, Apr. 29, 2013, pp. 216-228.
Elowitz, et al., "A Synthetic Oscillatory Network of Transcriptional Regulators", In Journal of Nature, vol. 403, Jan. 20, 2000, pp. 335-338.
Ferrell, et al., "Modeling the Cell Cycle: Why do Certain Circuits Oscillate?", In Journal of Cell, vol. 144, Issue 6, Mar. 18, 2011, pp. 874-885.
Frazier, et al., "Model Misspecification in ABC: Consequences and Diagnostics", Retrieved from: <<https://arxiv.org/pdf/1708.01974v1.pdf>>, Aug. 7, 2017, 26 Pages.
Gardner, et al., "Construction of a Genetic Toggle Switch in *Escherichia coli*", In Journal of Nature, vol. 403, Jan. 20, 2000, pp. 339-342.
Gelman, Andrew, "Analysis of Variance—Why It Is More Important Than Ever", In Journal of the Annals of Statistics, vol. 33, Issue 1, 2005, 53 Pages.
Gennemark, et al., "A Simple Mathematical Model of Adaptation to High Osmolarity in Yeast", In Journal of Silico Biology, vol. 6, Issue 3, Apr. 29, 2006, 21 Pages.
Gibson, et al., "Enzymatic Assembly of DNA Molecules up to Several Hundred Kilobases", In Journal of Nature Method, vol. 6, Issue 5, May, 2009, 5 Pages.
Girolami, Mark, "Bayesian Inference for Differential equations", In Journal of Theoretical Computer Science, vol. 408, Issue 1, Nov. 2008, pp. 4-16.
Gorbach, et al., "Scalable Variational Inference for Dynamical Systems", In Proceedings of Advances in Neural Information Processing Systems, Dec. 4, 2017, 10 Pages.
Gorochowski, et al., "A Minimal Model of Ribosome Allocation Dynamics Captures Trade-offs in Expression Between Endogenous and Synthetic Genes", In Journal of American Chemical Society, vol. 5, Issue 7, May 3, 2016, pp. 710-720.
Gorochowski, et al., "Using Synthetic Biological Parts and Microbioreactors to Explore the Protein Expression Characteristics of *Escherichia coli*", In Journal of American Chemical Society, vol. 3, Issue 3, Dec. 3, 2013, pp. 129-139.
Grant, et al., "Orthogonal Intercellular Signaling for Programmed Spatial Behavior", In Journal of Molecular Systems Thology, vol. 12, Issue 1, Jan. 25, 2016, 13 Pages.
Hagge, Tobias, et al., "Solving Differential Equations with Unknown Constitutive Relations as Recurrent Neural Networks", Retrieved from:<<https://arxiv.org/pdf/1710.02242.pdf>>, Oct. 6, 2017, 19 Pages.
Hodgkin, et al., "A Quantitative Description of Membrane Current and its Application to Conduction and Excitation in Nerve", In Journal of the Journal of Physiology, vol. 117, Issue 4, Aug. 28, 1952, pp. 500-544.
Hoffman, et al.,"Stochastic Variational Inference", In Journal of Machine Learning Research, vol. 14, Issue 1, May 2013, pp. 1303-1347.
Hooker, et al., "Goodness of Fit in Nonlinear Dynamics: Misspecified Rates or Misspecified States?", In Journal of the Annals of Applied Statistics, vol. 9, Issue 2, Jun. 2015, 25 Pages.
Kannan, et al., "Reconstructing Dynamic Promoter Activity Profiles from Reporter Jean Data", In Journal of American Chemical Society Synthetic Biology, vol. 7, Issue 3, Feb. 19, 2018, 15 Pages.
Karlsson, et al., "Nonlinear Mixed-effects Modelling for Single Cell Estimation: When, Why, and How to Use It", In Journal of BioMed Central Systems Biology, Sep. 4, 2015, 15 Pages.
Kelly, et al., "Measuring the Activity of BioBrick Promoters using an in vivo Reference Standard", In Journal of Biological Engineering, vol. 3, Issue 4, Mar. 20, 2009, 13 Pages.
Keren, et al., "Promoters Maintain their Relative Activity Levels under Different Growth Conditions", In Journal of Molecular Systems Biology, vol. 9, Issue 1, Oct. 29, 2013, 17 Pages.
Khalil, et al., "Synthetic Biology: Applications Come of Age", In Journal of Nature Reviews Genetics, vol. 11, Issue 5, May 2010, 27 Pages.
Kingma, et al., "Auto-encoding Variational Bayes", Retrieved from:<<https://arxiv.org/pdf/1312.6114.pdf>>, May 1, 2014, 14 Pages.
Kreft, et al., "Introducing Multilevel Modeling", In SAGE Publications, Apr. 7, 1998, 161 Pages.
Krishnan, et al., "Deep Kalman Filters", Retrieved from:<<https://arxiv.org/pdf/1511.05121.pdf>>, Nov. 25, 2015, 17 Pages.

(56) References Cited

OTHER PUBLICATIONS

Lagaris, et al., "Artificial Neural Networks for Solving Ordinary and Partial Differential Equations", In Journal of IEEE Transactions on Neural Networks, vol. 9, Issue 5, Sep. 1998, pp. 987-1000.

Leloup, et al., "Toward a Detailed Computational Model for the Mammalian Circadian Clock", In Proceedings of the National Academy of Sciences, vol. 100, Issue 12, Jun. 10, 2003, pp. 7051-7056.

Iten, et al., "Discovering Physical Concepts with Neural Networks", In Repository of arXiv:1807.10300v3, Jan. 23, 2020, 18 Pages.

Lu, et al., "Extracting Interpretable Physical Parameters from Partial Differential Equations using Unsupervised Learning", In Proceedings of the 32nd Conference on Neural Information Processing Systems, Dec. 8, 2018, 4 Pages.

"International Search Report and Written Opinion Issued in PCT Application No. PCT/US19/068461", dated Apr. 20, 2020, 14 Pages.

Roeder, et al., "Efficient Amortised Bayesian Inference for Hierarchical and Nonlinear Dynamical Systems", In Repository of arXiv:1905.12090v2, Oct. 1, 2019, 25 Pages.

Temirchev, et al., "Deep Neural Networks Predicting Oil Movement in a Development Unit", In Repository of arXiv:1901.02549v1, Jan. 10, 2019, 16 Pages.

Pontryagin, L. S., "Mathematical Theory of Optimal Processes—Chapter II—The Proof of the Maximum Principle—Section 12—The System of Variational Equations and its Adjoint System" In Publication of CRC Press, Mar. 6, 1987, pp. 83-85.

Konstantinos, et al., "Analytical Approach for the Calculation of Promoter Activities Based on Fluorescent Protein Expression Data", In Journal of Engineering Biology, The Institution of Engineering and Technology, Dec. 1, 2017, pp. 77-85.

"International Search Report and Written Opinion Issued in PCT Application No. PCT/US19/037574", dated Oct. 7, 2019, 16 Pages.

\* cited by examiner

MODELLING ORDINARY DIFFERENTIAL EQUATIONS USING A VARIATIONAL AUTO ENCODER

TECHNICAL FIELD

The present disclosure relates to the modelling of ordinary differential equations (ODEs) based on a machine learning algorithm in the form of a variational auto encoder (VAE). For instance, this may be used to predict a temporal profile of the cell density in a growing population of cells engineered to produce a desired product such as a protein.

BACKGROUND

Currently, inferring parameters of dynamic systems which are described by ordinary differential equations (ODEs) is computationally intensive. An example system that can be modelled by a differential equation is a genetic circuit. A "device" is inserted into a cell in vitro, where the device comprises one or more cassettes, each cassette comprising at least one gene and at least one respective promoter. The promoter causes the gene to express a protein, such as a fluorescent reporter protein whose light output in a population of cells can be measured as a reporter of the activity of the genetic circuit. The rate of change of the concentrations of circuit components, and also the cell density, over time, can often be expressed using ODEs. Measurements can be collected to characterise the circuit activity in response to external forcing (pharmacological inhibitors, small molecule inducers, etc.), which can influence cell growth in a complex way that is difficult to capture with prescribed mechanistic models. Furthermore, there can be fluctuations in measurement conditions which can influence cell growth and gene expression more generally. Such variations can be captured using a nonlinear mixed effects (NLME) framework applied to the parameters that might be expected to vary between measurements.

Previous solutions for parameterizing ODEs with mixed effects include sampling methods, such as Markov chain Monte Carlo (MCMC) approximate Bayesian computation (ABC) and expectation maximization (EM). These are slow, and can require huge computing resources. Therefore they scale poorly. Another disadvantage is that for new data, they require running the inference again to identify parameters of new data. Yet another issue is model misspecification. Existing approaches involve assuming some predetermined form of the ODE. However if this includes, say, a missing variable or misspecified rate function, then the model may not generate accurate predictions.

Using a machine learning algorithm in the form of a variational autoencoder (VAE) would address some of these issues. A variational autoencoder is a form of machine learning algorithm comprising an encoder and a decoder, each comprising a neural network. The encoder receives input observations and encodes them into a compressed representation called a latent vector. The decoder is arranged to decode the latent vector back into values in the real-world feature space. In the learning phase, the values output by the decoder are compared to the observations in the in experience data input to the encoder, and the neural nets of the encoder and decoder are trained to minimize a measure of overall difference between the input observations and the output of the decoder. Hence the VAE learns to encode observations into a compressed latent vector and to decode back again. The reason for imposing this constraint, as opposed to just a general neural network, is that forcing the network to learn a compressed form of the observations can help the network to ignore noise, make better generalization and/or converge more rapidly to a solution. Once learned, the model can be used to make predictions or inferences. VAEs can be more computationally efficient and therefore scalable than conventional statistical methods. Also, the neural nets do not necessarily assume any particular form of the ODE, thus addressing the model misspecification issue.

Variational autoencoders have been applied to stochastic differential equations (SDEs) and state-space models (discrete-time models). One paper has also proposed the use of variational autoencoders to modelling ODEs ("Neural Ordinary Differential Equations", Ricky T. Q. Chen et al, $32^{nd}$ Conference on Neural Information Processing Systems, NIPS 2018, Montreal, Canada).

SUMMARY

According to one aspect disclosed herein, there is provided computer-implemented method as comprising, from each of multiple trials, obtaining a respective series of observations y(t) of a subject over time t; and using a variational auto encoder to model an ordinary differential equation, ODE. The variational auto encoder comprises an encoder for encoding the observations into a latent vector z and a decoder for decoding the latent vector, the encoder comprising at least a first neural network and the decoder comprising one or more second neural networks. The ODE as modelled by the decoder has a state x(t) representing one or more physical properties of the subject which result in the observations y, and the decoder models a rate of change of x with respect to time t as a function f of at least x and z: dx/dt=f(x, z). The method further comprises operating the variational auto encoder to learn the function f based on the obtained observations y by tuning weights of the first and second neural networks. The learning comprises performing variational inference over the latent vector z, whereby z has a plurality dimensions and in the encoder each dimension is constrained to comprising one or more samples of a predetermined type of probabilistic distribution parameterized by a respective one or more parameters.

The existing approach proposed by Chen et al is limited. They only perform inference over an initial state of the ODE at time t0 (see FIG. 6 of Chen, noting that the labels x and z are used differently in Chen than herein). They then solve an ODE with this initial state to provide dx/dt. In the present disclosure on the other hand, the latent vector z represents the parameters of the ODE over which variational inference is performed. The state is represented as x and the observations y (whereas in Chen, the states are z and the observations are x). In other words Chen only learns to initialize the state of an ODE whereas in the present disclose the latent vector z represents the parameters of an ODE mode. This provides a fuller model, which is thus capable of more accurate predictions or inferences.

In embodiments, optionally the model may further take into account the effects of differing circumstances from one trial to the next. Hence in embodiments, the multiple trials may comprise trials under conditions of different variants d of the subject and/or different external signals u applied to the subject. In this case where f may be further modelled as a function of one or both of d and u: dx/dt=f(x, z, d), dx/dt=f(x, z, u) or dx/dt=f(x, z, d, u).

For instance, the subject may be a device of a genetic circuit for producing a product such as one or more proteins. The device comprises one or more cassettes each comprising at least one respective gene and at least one respective promoter, wherein the promoter induces the gene to express the desired product (e.g. protein). The one or more properties resulting in the observations y may comprises the density of the cells in the cell population, and/or an intercellular concentration of one or more proteins and/or other species between the cells in the population. The produced protein (or one of the produced proteins) may comprise a florescent reporter protein, in which case the observations may comprise a measure of an amount of light received from the fluorescent protein. In embodiments, the variants of the device may comprise different cassettes or different combinations of cassettes. The different external signals may comprise one or more different treatments applied to the cell population comprising the device, which could be positive and/or negative treatments. Because the method learns a distribution that is conditioned on device and/or treatment information, it can predict new combinations of biological parts and/or treatments that were not trialled in the original observations.

Other example applications include modelling of human, animal or plant populations; modelling the rates of chemical reactions; or meteorology.

In embodiments, optionally at least some elements of z are dependent on x. For instance, the latent vector z generated by the encoder may comprise at least a local vector encoded from the observations y by the first neural network, the local vector comprising samples of a first, local probabilistic distribution which represents a variation per observation, wherein the local probabilistic distribution is dependent on x and d. In some embodiments, the latent vector z may further comprises a device-dependent vector comprising samples of a second, device-dependent probabilistic distribution which represents a variation in the observations per device, the device-dependent distribution being dependent on d but not x. And/or, as another example, the latent vector z may further comprise a global vector comprising samples of a third, global probabilistic distribution which represents a global variation in the observations, the global distribution being dependent on neither d nor x.

Embodiments of the present disclosure thus provide a method of variational inference for ODE models with "mixed effects". Mixed effects herein means that parameters of the ODE are mixed in terms of their dependencies: some may be global (fixed) over the entire data set, and/or some are dependent on sub-populations (e.g. groups and/or devices), while some are local and/or random effects that depend upon the individual data instances or observations. In the existing uses of variational auto encoders to model SDEs and ODEs, they do not characterise mixed effects.

In embodiments, optionally the probabilistic distribution or distributions may comprise a model of a random effect, such as a noise model.

In embodiments, the method may optionally use a so-called "grey box" model. That is to say, in embodiments, the decoder function f may be modelled in the form of a known analytical equation for estimating the production of said quantity, the equation comprising a plurality of parts. In this case, the one or more second neural networks may comprises a plurality of second neural networks, each of said parts being modelled by at least a respective one of the second neural networks. E.g. said form may comprises $dx/dt = f_1 - x \cdot f_2$, where each of $f_1$ and $f_2$ comprises at least a respective one of the second neural networks, and each is a function of x and z and optionally one or both of d and u.

This provides a useful balance between, on the one hand, the interpretability of a model that attempts to represent the form of the relationship, and on the other hand, guarding against model misspecification. For example when modelling the genetic circuit, the positive term $f_1$ models a function describing how the protein is produced, and the negative term $-xf_2$ is a loss term modelling loss due to mass action kinetics, e.g. including the effects of negative treatments. The fact that $f_1$ and $f_2$ comprise neural networks mean they can learn to model the system with low risk of misspecification. However, the fact that the decoder is constrained to a representation comprising the separate positive and negative terms means that some meaningful interpretation can still be placed on the two terms.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
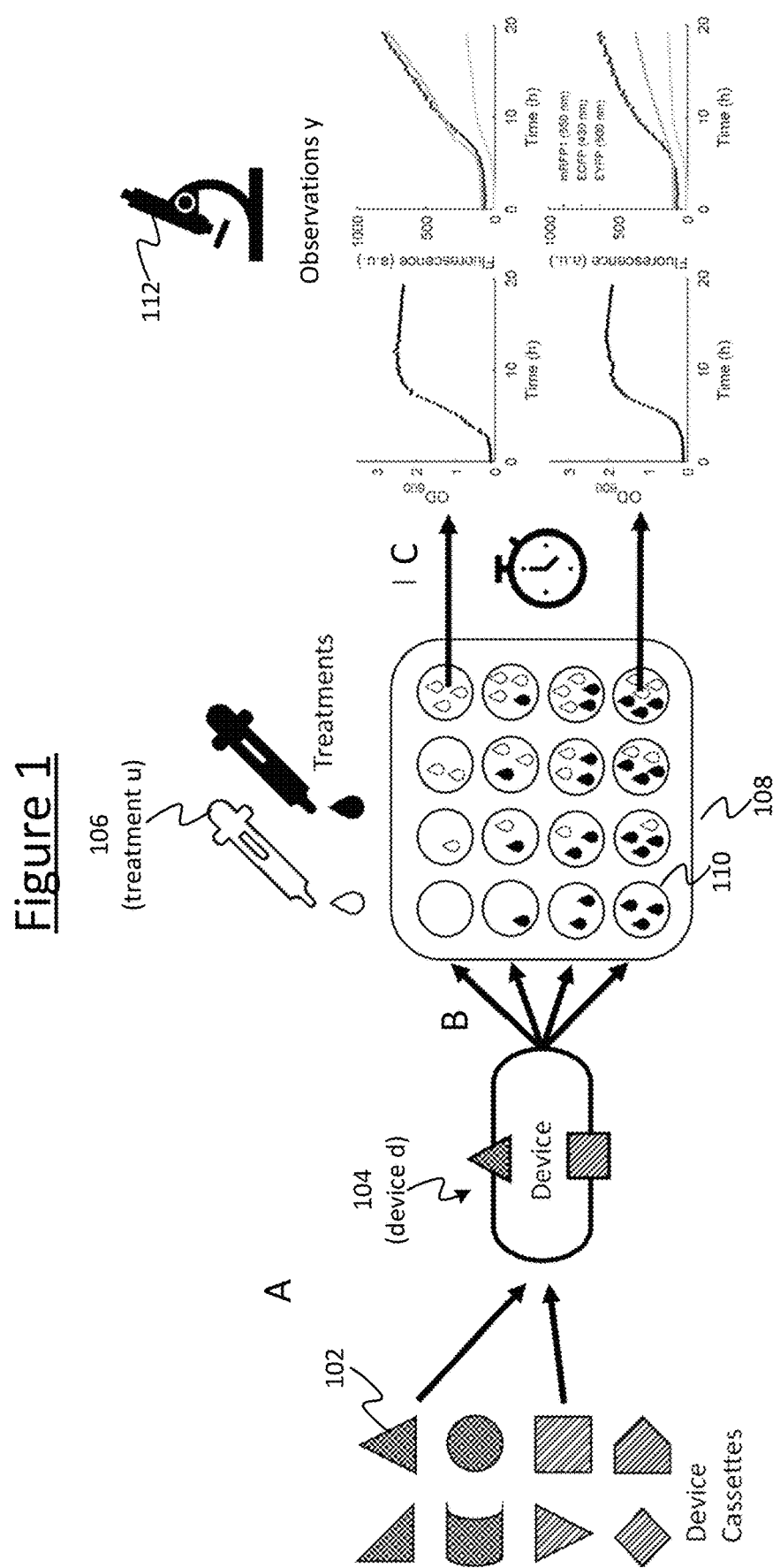
FIG. 1 is a schematic illustration of an experiment.

The following presents a new approach for inferring parameters of ODE models with mixed effects. Mixed effects capture differences among the datasets that the ODEs seek to describe. The inference method builds upon a variational autoencoder that enables model parameters to be updated automatically using reverse-mode automatic differentiation. The ODE right-hand sides can be specified as explicit functions (white box), flexible neural networks (black box), or a mixture of the two (grey box).

The use of a VAE goes at least some way to addressing the issue of computational scalability. Inferring parameters of dynamical systems described by ordinary differential equations (ODEs) is computationally intensive. This is exacerbated when attempting to scale to datasets containing "mixed effects", as this increases the number of model evaluations required. Embodiments also address the issue of model misspecification. Either a black box or a "grey box" approach may be used to address the problem of model misspecification, which commonly arises in scientific research when evaluating competing hypotheses.

Previous solutions to modelling ODEs include sampling methods, Approximate Bayesian Computation, and NON-MEM. In sampling, the main approaches are MCMC (Markov chain Monte Carlo) and SMC (sequential Monte Carlo). These methods involve traditional Bayesian posterior sampling, leading to a requirement of running the ODE solver for each parameter setting. The technique is slow, and requires huge computing resources. Therefore it scales poorly. Another disadvantage is that for new data, requires running inference again to identify parameters of new data.

Model misspecification is not commonly considered in ODE modelling, except one paper, which establishes a first attempt to detect misspecifications as either unaccounted-for stochastic variation, a misspecified rate function, or a missing variable, and provides a statistical test for each. Embodiments disclosed herein provide a more general approach to describing functional forms (c.f. when there is a misspecified rate function), which provides an upper bound for what is possible within the ODE model class.

Some previous work has applied variational autoencoders to stochastic differential equations (SDEs) and state-space models (discrete-time models). However they include no effort to characterise mixed (random) effects. The previous work on SDEs only characterises a limited domain of problems where all changes in the model are fully observed rather than latent or not explicitly represented in the measurements.

Variational autoencoders can also be used for ODEs. Outputs of ODEs are high-dimensional spaces. Embodiments disclosed herein use automatic differentiation through an ODE solver to provide gradient updates to a single objective function, allowing scalable inference. Embodiments also use amortized inference for ODE identification: new data in, and direct posterior estimates.

Embodiments employ conditional encoders and decoders for mixed-effects. Random and/or group effects can be explicitly modelled for the first time in c-VAE. It is also possible to combine new group components to predict on new, unseen combinations of group identifiers.

Furthermore, embodiments use the universal function approximation characteristics of neural networks to specify terms of the ODE right-hand sides, either completely (black box), or partially (grey box). E.g. the use of a black-box neural network to replace mechanistic model provides an alternative, general model; or model selection, comparison and/or improvement may be achieved via a grey box.

Figure 1A:
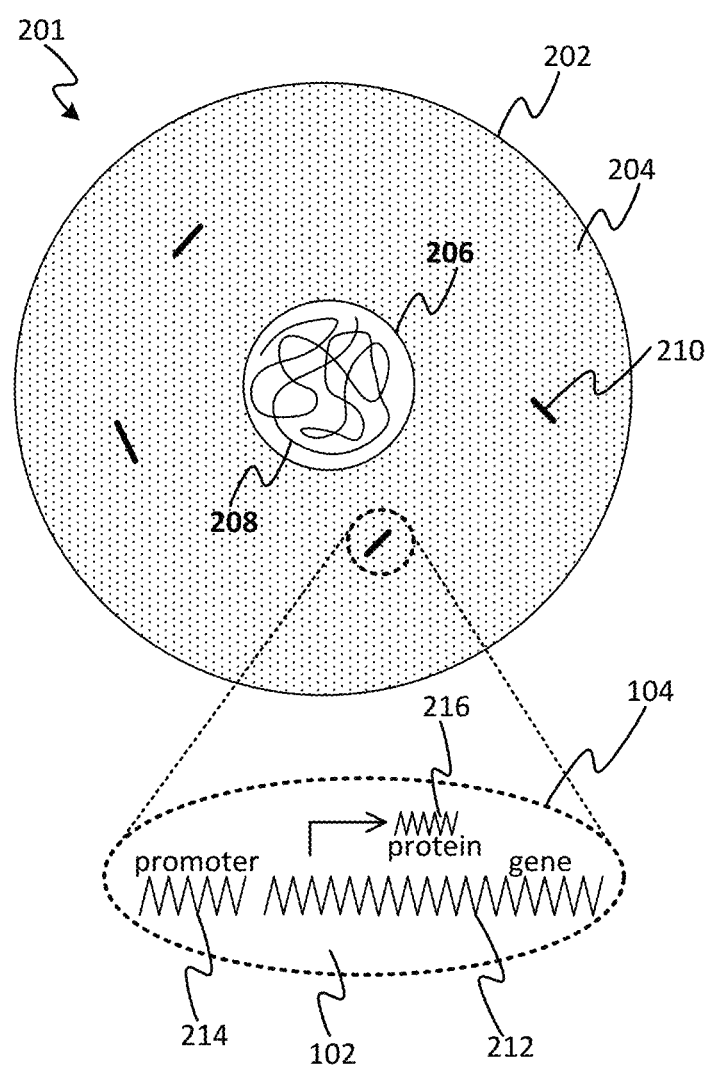
FIG. 1A is a schematic illustration of a genetic circuit.
Figure 1B:
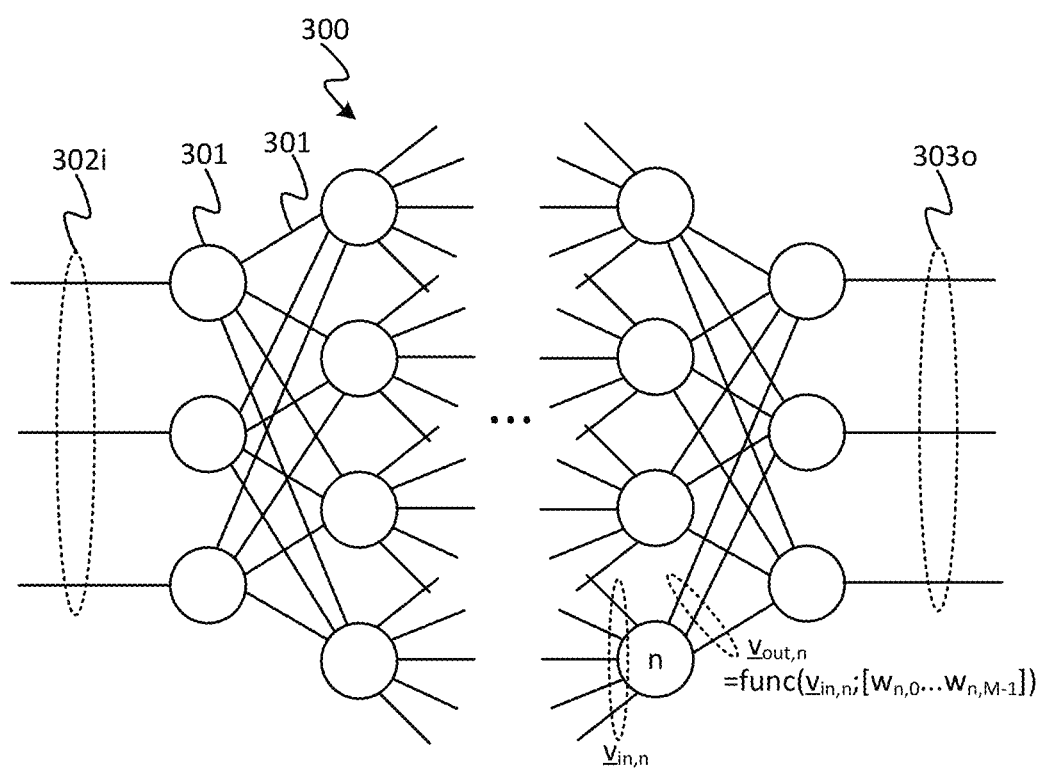
FIG. 1B is a schematic representation of a neural network.

FIGS. 1 and 1A illustrate an exemplary application of the disclosed techniques to a genetic circuit.

FIG. 1A shows a cell 201 comprising cytoplasm 204 contained within a cell wall 202, and a nucleus 206 within the cytoplasm 204. The cell 201 may for example be a bacteria or a yeast cell. The nucleus 206 comprises nuclear DNA 208, and the cytoplasm 204 may also comprise extra-nuclear DNA 210. An artificial "device" 104 is inserted, in vitro, into the cell 201 using known genetic manipulation techniques. In embodiments the device 104 may be inserted as a piece of extra-nuclear DNA 210, or may be inserted into the nuclear DNA 208. When the cell 201 replicates, the inserted device 104 will also replicate. A vector such as a plasmid may be included as a carrier of the device 104 to help ensure replication.

The device 104 comprises one or more cassettes 102. Each cassette 102 comprises at least one respective gene 212 and at least one respective promoter 214. The promoter 214 causes the gene 212 to produce (express) a protein 216. The rate at which this process occurs may depend on a number of factors, such as the current density of the population of cells, and/or one or more external factors such as one or more treatments (positive and/or negative) applied to the population.

In embodiments the device 104 comprises a plurality of cassettes 102. Thus the device 104 may comprise a combination of two or more different biological components.

FIG. 1 shows an experiment for trialling a device d (104) under the influence of multiple different treatments u (106). In a given instance of the experiment, a given device 104 is created from a given cassette 102 or combination of two or more cassettes 102 (step A). The device 104 is inserted into a cell 201 such as a bacteria, then replicated, and placed within each of a plurality of wells 110 in one or more trays 108 (step B). Optionally a treatment or combination of treatments u is applied to some or all of the wells 110 before or during growth.

During a growing period, an observation process 112 is used to take a series of observations y indicative of one or more properties of the population in each of the wells 110 (step C). E.g. these one or more properties may comprise the cell density, and/or an intercellular concentration of one or more proteins or other species. In embodiments the protein(s) 216 comprise a florescent protein and the observations y are observations of the fluorescence. In embodiments, each value of y at any given time t may be a vector. For example, the proteins expressed by the device 104 may comprise a red fluorescent protein (RFP), cyan fluorescent protein (CFP) and yellow fluorescent protein (YFP). The vector y may comprise four elements: the fluorescence of the RFP, fluorescence of the CFP, the fluorescence of the YFP, and the overall optical density (OD) due to all three. I.e. y(t)=[OD(t), YFP(t), CFP(t), RFP(t)]. In general however, y at a given time t may be a scalar or a vector (wherein when y is a vector, some or all of the elements of y are a function of time t).

The relation between the actual properties and the observable measurement of the reporter signal y can be described by an observation function g, where the function g describes the relationship between the reporter signal y and the values of the actual properties being modelled (which can never be directly measured). In embodiments g also takes into account the effect of the observer process 112. The function g is taken as a predetermined relationship that is known or estimated to be known a priori (e.g. based on known theory or past experimentation). It may incorporate more of fewer known factors. For instance, as an approximation, bulk fluorescence can be decomposed as an assumed equal concentration of fluorescent protein in each cell, multiplied by the number of cells there are. In principle, each cell is likely to have varying concentrations, so for (deterministic) models that seek to describe the average concentration, this is a potential source for some error. This may be overcome by using stochastic models, or alternatively the error may simply be deemed tolerable. Also, one may or may not choose to incorporate fluorescence from sources other than the fluorescent protein. These include fluorescence emitted at the given wavelength from other cellular components (cellular autofluorescence), and fluorescence emitted at the given wavelength arising from non-cellular sources (background fluorescence). Embodiments subtract the constant background fluorescence, but incorporate a latent variable that describes cellular autofluorescence. Therefore, overall, the equation for the bulk fluorescence of protein FP is given by: FP=cell density*([fp]+[cellular autofluorescence])+ [background fluorescence], where[fp] is the intracellular concentration of FP.

For a given experiment, a respective series of observations y(t) is taken from each of the wells 110. Thus a plurality of respective trials are performed in parallel in each of the wells 110, each resulting in a respective time series of observations y. In embodiments at least some of these series result from different treatments or different combinations of treatments 106, labelled u herein. The different treatments u may comprise treatments with different substances, treatment with different concentrations of a given substance, and/or treatments with different timings during the growth period. The treatment(s) may comprise one or more negative treatments, e.g. a substance to harm the cells such as ethanol or a substance to inhibit translation. And/or, the treatment(s) may comprise one or more positive treatments, such as nutrients.

In embodiments the experiment may also be repeated multiple times, at least some instances of the experiment using different devices 104 comprising a different cassette or combination no cassettes 102. Thus the overall results may include times series for different devices d, different treatments u, and/or different combinations of devices d and treatments u. In general, the multiple trials may be performed in parallel with one another in different wells, and/or over multiple experiments, or a combination of these approaches. The trials in different wells 110 and/or experiments could comprise different devices, treatments, combinations of treatments, and/or combinations of device and treatment(s).

Figure 2:
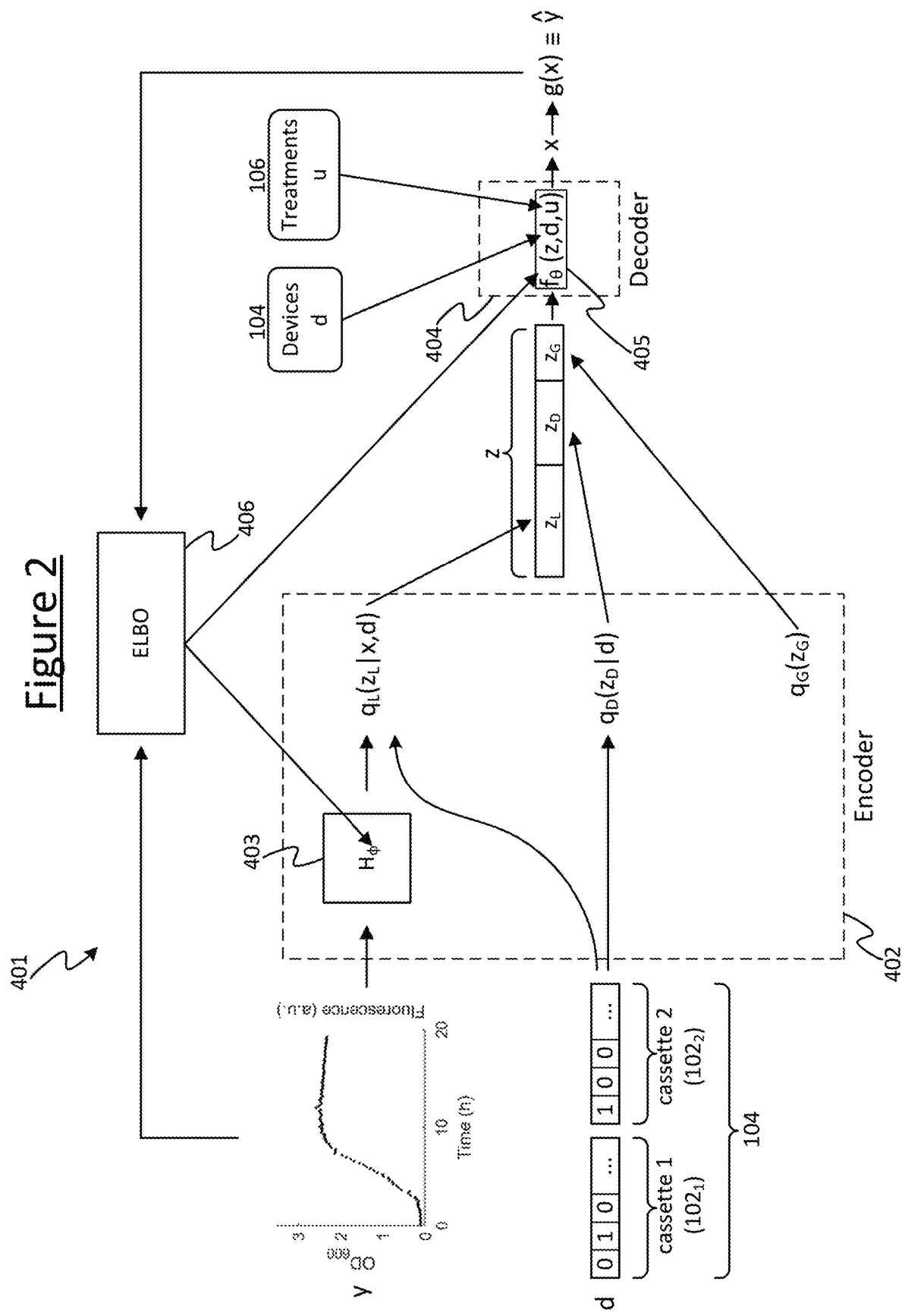
FIG. 2 is a schematic representation of a variational auto encoder.

Referring briefly to FIG. 2 (to be revisited in more detail shortly), the presently disclosed method uses a variational autoencoder 401 to predict the time profile of a quantity such as the density x of the copies of the cell 301 in a given sampled population (e.g. a given well 110). The variational autoencoder 401 comprises an encoder 402 comprising at least one neural network 403, and a decoder 404 which also comprises at least one neural network 405.

FIG. 1A illustrates the general principle behind a neural network 300, which may be employed to implement the neural nets 403, 405 of each the encoder 402 and decoder 404 respectively. A neural network 300 comprises a graph of interconnected nodes 301 and edges 302 between nodes, all implemented in software. Each node 301 has one or more input edges and one or more output edges, with at least some of the nodes 301 having multiple input edges per node, and at least some of the nodes 301 having multiple output edges per node. The input edges of one or more of the nodes 301 form the input to the graph 302*i* (the input vector in the case of multiple input edges), and the output edges of one or more of the nodes 301 form the output of the graph 302*o* (output vector in the case of multiple output edges). Further, the output edges of at least some of the nodes 301 are connected to the input edges of at least some others of the nodes 301.

Each node 301 represents some function of its input edges, the outputs of the function being the output edges of the node, such that the values of the output edges of the node 301 depend on the values at its input edges according to the respective function. The function of each node 302 is also parametrized by one or more respective parameters w, sometimes also referred to as weights (not necessarily weights in the sense of multiplicative weights, though that is one possibility). Thus the relation between the values of the input and output edges 302 of each node 301 depends on the respective function of the node and its respective parameters.

During the learning stage, experience data is received at the inputs 302*i* of the graph and the weights of the nodes 301 are tuned based on feedback from the output(s) 302*o* of the graph. The experience data comprises multiple different input data points, each comprising a value or vector of values corresponding to the input edge or edges 302*i* of the graph 300. With each data point, feedback from the resulting output value(s) at the output edge or edges 302*o* is used to gradually tune the weights of the nodes 301 so that, over many pieces of experience data, the weights of the various nodes 301 in the graph 300 tend toward a state whereby the output of the graph will closely match the desired or expected output for a given input. Examples of such feedback techniques include for instance stochastic back-propagation.

Figure 3:
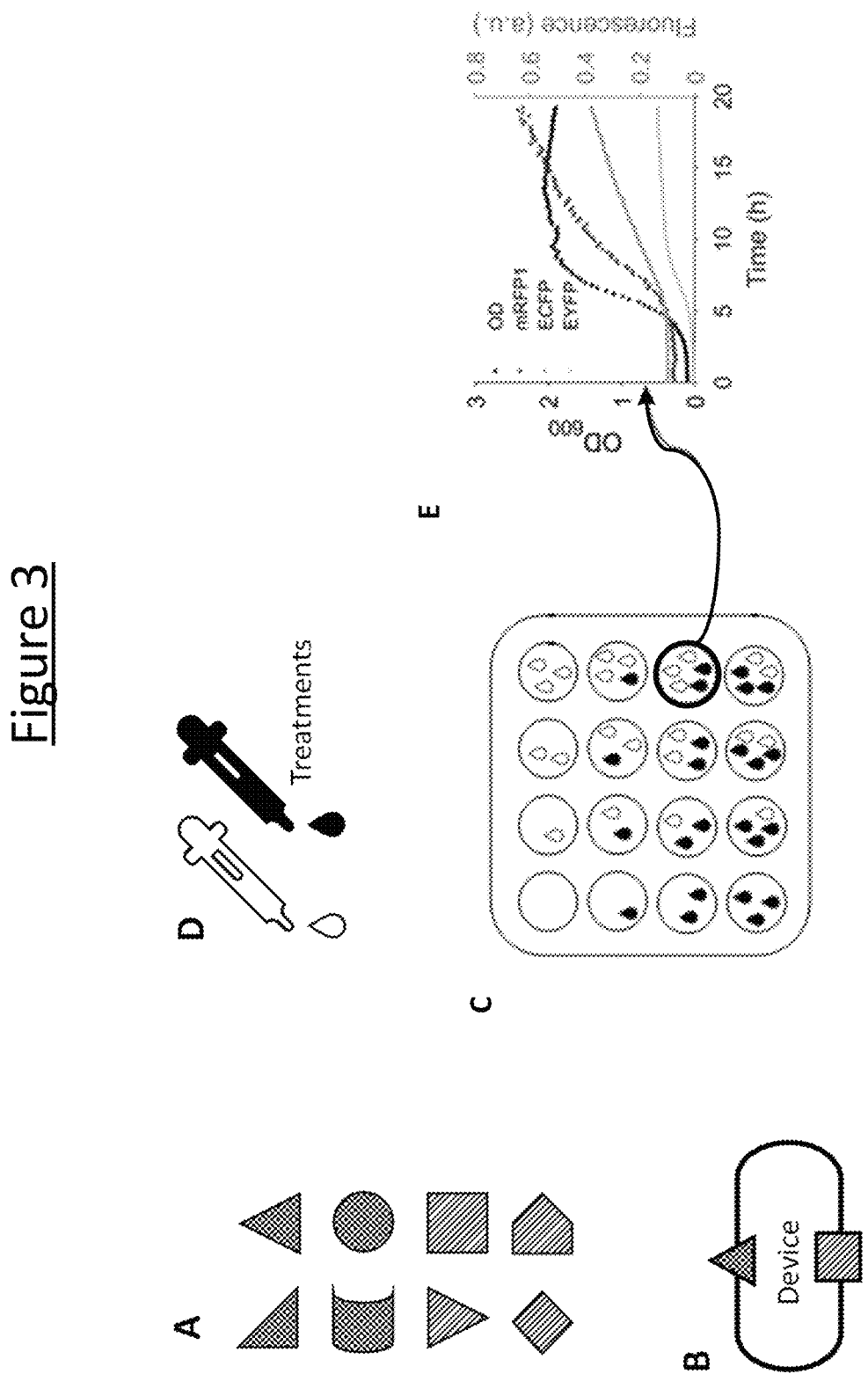
FIG. 3 is a schematic view of a data generating process for a synthetic biological circuit.

Once trained, the graph 300 can then be used to predict a value of the output edge or output vector 302*o* for a given value of the input edge or input vector 302*i*, or vice versa, to infer an input for a given output. Machine learning algorithms such as those based on neural networks are, in themselves, known in the art, and the discussion of FIG. 3 is only given as a brief overview for illustrative purposes.

Returning to FIG. 2, the neural net 403 of the encoder 402 is configured to receive the input observations y and encode them into a latent vector z. The vector z is a compressed (i.e. encoded) representation of the information contained in the input observations y. No one element of the vector necessarily represents directly any real world quantity, but the vector z as a whole represents the information in the input data in compressed form. The decoder 404 is arranged to decode the latent vector z back into values in a real-world feature space, i.e. back to an uncompressed form representing the real-world properties. In this case the decoder 404 decodes into predictions x(t) of the values of the modelled properties (e.g. cell density and intercellular concentration), which are related to y by g. x is a vector of the ODE modelled by the decoder 404. The state x may be a scalar or a vector. Where it is said that x(t) is a vector, this means a vector at a given time t (some or all of the elements of x are functions of t). y at a given time t may be a scalar or a vector (and in the case where it is a vector, some or all of the elements of y are each a function of t). The state x represents one or more physical properties of the subject, preferably meaning it directly represents the one or more physical properties (i.e. real-world properties) (as opposed to the latent vector z which encodes the observations of the real-world properties in latent form, but the elements of z themselves to not directly map onto any real-world property). So for example if the properties in question comprise cell density, then x comprises an estimated value of the cell density.

In the training phase, predicted versions ŷ of the observations y are generated from the predictions x generated by the decoder 404 using the predetermined function g, ŷ=g(x). The predicted observations ŷ and the actual observations y from the input experience data are fed into a comparison function 406 where they are compared. Based on this, the comparison function 406 tunes the weights φ of the neural network(s) 403 in the encoder 402 and the weights θ of the neural net(s) 405 in the decoder 404 y so as, over the various trials, to learn to minimize a measure of overall difference between the input observations y and the output of the decoder 404. Hence the VAE 401 learns to encode observations into a latent vector z and to decode a latent vector back again. Once trained, the model can be used to make predictions or inferences for existing or new data.

In embodiments, the comparison function 406 may for example comprise an ELBO (evidence lower bound) function, which uses cost function minimization based on gradient descent. However, in general other comparison functions 406 are also known in the art for tuning the encoder and decoder neural networks of a VAE 401.

The requirement to learn to encode to z and back again amounts to a constraint placed on the overall neural network of the VAE 401 formed from the constituent neural networks 403, 405. This is the general principle of an autoencoder. The purpose of forcing the autoencoder to learn to encode and then decode a compressed form of the data, is that this can achieve one or more advantages in the learning compared to a generic neural network; such as learning to ignore noise in the input data y, making better generalizations, or because when far away from a solution the compressed form gives gradient information about how to quickly converge to a solution.

In a variational autoencoder 401, the latent vector z is subject to an additional constraint that it follows a predetermined form (type) of probabilistic distribution such as a multidimensional Gaussian distribution or gamma distribution. In this case each element (dimension) of the latent vector $z=[z_0, z_1, z_2, \ldots]$ in fact comprises a set of one or more sub-elements which are constrained to being samples of the distribution (e.g. Gaussian) in that dimension. Each dimension of z is derived from a respective 1D distribution, in the respective dimension of that element $z_n$ in z space, that is parameterized by one or more (typically at least two) parameters of that distribution. For instance, each element (dimension) $z_n$ may comprise samples from a Gaussian described by a respective pair of mean $\mu_n$ and variance $\sigma_n^2$ (or standard deviation σ). I.e. each $z_{k=0, 1, 2} \ldots$ comprises a respective set or series of one or more samples from a respective distribution described or parameterized by $[\mu, \sigma_k^2]$, and the overall probabilistic distribution $q=[q_0(z_1), q_1(z_1), q_2(z_2), \ldots]$. So the probabilistic or "q-distribution" describes a probabilistic distribution such as a Gaussian in terms of parameters such as its mean and variance (or standard deviation) in each of the elements (dimensions) of the latent vector z. The parameters of the distribution (e.g. the means and variances or SDs) may be predetermined, or may be learned outputs of the encoder neural network 403, or a combination. The purpose of the q-distribution is to impose a constraint on the way that z encodes y. One feature imposed by this constraint is that the elements of z are independent of one another (no correlation between them), whereas the various values of y in the uncompressed data are typically not all independent of one another. Hence the VAE 401 imposes a reduction in dimensionality in comprising from y to z space. This can help in achieving the benefits mentioned above, such as ignoring noise, making generalizations or converging more quickly to a solution.

As mentioned, the experiment may be performed for different variants of the device d. Each device d comprises one or more different cassettes, and in embodiments different combination of multiple cassettes 102 (two are labelled $102_1$ and $102_2$ in FIG. 1 by way of illustration). In embodiments, a given cassette may be expressed in the algorithm as a 1-hot vector, e.g. [0, 1, 0, 0, . . . ] where each element represents a possible type of cassette, and a 0 or 1 in the element represents whether or not the cassette 102 in the device 104 is that type of cassette. The value of the device d used in the encoder 402 and decoder 404 may be expressed as the 1-hot vector of its constituent cassette 102, or a combination (e.g. concatenation nor union) of the 1-hot vectors of the constituent cassettes 102. Of course it will be appreciated that this is just one possible representation and not limiting to the principles disclosed herein.

In embodiments the neural net 403 of the encoder 402 is dependent on the device d and the current value of the state x representing the modelled property (e.g. cell density in the culture). The neural net 403 thus learns to encode the input observations y into a vector parameterizing a local distribution $q_L$ per device d and per point in the time series, q(z|x,d) (q of z given x and d). This vector may be referred to as the local vector $z_L$. As described in relation to z generally, in embodiments each element (dimension) of $z_L$ may comprise a respective set of one or more samples from a distribution (e.g. Gaussian) parameterized by a respective one or more parameters (e.g. a mean μ and a variance $\sigma^2$ or standard deviation σ) describing the distribution in a different respective dimension in z space. I.e. for each $z_L=[z_{L0}, z_{L1}, z_{L2}, \ldots]$, then $z_{Lk}$ comprises samples of a respective 1D distribution (e.g. Gaussian) described by $[\mu_{Lk}, \sigma_{Lk}^2]$, and the overall probabilistic distribution $q_L=[q_L(z_{L0}|x,d), q_{L1}(z_{L1}|x, d)), \ldots ]$. So the probabilistic q-distribution describes a probabilistic distribution in each of the elements (dimensions) of at least the vector $z_L$.

The input observations y (time series y(t)) are also collected under conditions of different treatments or combinations of treatments u. In embodiments the treatment u is taken into account in the decoder 404, 405. In embodiments a given treatment may be expressed in the algorithm, including in the decoder 404, as a 1-hot vector, e.g. u=[0, 0, 1, 0, . . . ], where each element represents a possible treatment (e.g. a given substance, concentration, timing or combination thereof), and a 0 or 1 represents whether or not that treatment is applied. In the case of multiple treatments, this may be expressed in the algorithm as a combination (e.g. concatenation or union) of the 1-hot vectors of the individual treatments. Again, it will be appreciated that this is just one possible representation and not limiting to the principles disclosed herein.

In embodiments, the encoder 402 is further configured to produce one or both of a device-dependent vector $z_D$ and/or a global $z_G$. The device-dependent vector $z_D$ parameterizes a further, device-dependent probabilistic distribution $q_D$ per device d, but not per point in the time series like the local q-distribution $q_L$. I.e. this distribution is dependent on d but not x. The global vector $z_G$ parameterizes yet another probabilistic distribution that is dependent on neither d nor x. I.e. this distribution is the same for all devices d over all points in the series (hence global). Note that in embodiments none of $q_L$, $q_D$ nor $q_G$ is dependent on the treatment(s) u. Like with $z_L$, each element (dimensions) of $z_D$ or $z_G$ may comprise a respective set of one or more samples from a distribution (e.g. Guassian) parameterized by one or more parameters describing the distribution in a different respective dimension in z space, e.g. a respective mean μ and variance $\sigma^2$ (or standard deviation σ). I.e. $z_D=[z_{D0}, z_{D1}, z_{D2}, \ldots]$ where each dimension $z_{Dk}$ comprises samples of a distribution (e.g. Gaussian) described by $[\mu_{Dk}, \sigma_{Dk}]$, and the overall probabilistic distribution $q_D=[q_{D0}(z_{D0}|d), q_{D1}(z_{D1}|d)), \ldots ]$. And $z_G=[z_{G0}, z_{G1}, z_{G2}, \ldots]$ where each dimension $z_{Gk}$ comprises samples of a distribution (e.g. Gaussian) described by $[\mu_{Gn}, \sigma_{Gk}]$, and the overall probabilistic distribution $q_G=[q_{G0}(z_{G0}), q_{L1}(z_{G1}), \ldots ]$. Though not illustrated as such in FIG. 2, the parameters of qD and qG could also be learned based on the encoder neural network 403, or could be predetermined, or a combination.

In such embodiments, the overall latent vector z comprises a combination (e.g. concatenation) of the local vector $z_L$ with one or both of the device-dependent vector $z_D$ and/or the global vector $z_G$. In embodiments, any one, more or all of the q-distributions $q_L$, $q_D$, $q_G$ may incorporate a noise model, e.g. Gaussian noise. Thus the model takes into account the effects of not only the fixed effects of the modelled process, and the conditional effect of the device variant d and/or treatment(s) u, but also one or more random effects. For instance, the mean $\mu_n$ and variance $\sigma_n^2$ (Or standard deviation $\sigma$) of each element $z_n$ of z give the centre point and width of a respective Gaussian noise model in that dimension n of z space.

The decoder 404 comprise at least one neural net 405 for decoding the encoded vector z back to the feature space of the state x representing the modelled property or properties, e.g. cell density. More specifically, the neural net(s) 405 of the decoder 404 model an ordinary differential equation (ODE) $dx/dt=f(x)$, where the neural net(s) 405 model(s) the function f. Further, the neural net(s) 405 of the decoder 404 may also be made a function of either or both of: I) the device d (the cassette of combination of cassettes), and II) the treatment or treatments u.

As mentioned, the q's are distributions that are parameterized by the elements of z. If there are K latent variables z, then there are K pairs of means and variances $\{\mu_k, \sigma_k^2\}$, k=1 . . . K, describing the respective distributions from which each of those K latent vectors are sampled (each of the K latent variables comprising a receptive set of one or more samples from its respective distribution). For the global vector $z_G$, these may be "free-parameters" that are adapted by gradient descent and do not depend on the observations y or the devices d. For the device dependent vector $z_D$, the means and variances may be device dependent, meaning that they will have a parameter for each device component (cassettes) (these can be thought of as device specific shifts of the mean and scaling of the variances). For the local vector $z_O$, the means and variances are functions of a neural network (e.g. the convolutions and hidden layer). But, in all cases, the q distributions are independent distributions (e.g. Gaussian distributions) over z.

What is passed to the decoder 404 are samples from q, which may be notated $z\sim q(z|y,d)$, i.e. samples of q given y and d (this notation assumes $z_G$, $z_D$, $z_L$ concatenated as a short hand—one could also write $z_G\sim q(z_G)$ and $z_D\sim q(z_D|d)$ and $z_L\sim q(z_L|y,d)$). Regarding how the randomness to enters into the dataflow, and therefore how to back propagate through the autoencoder, this is done using a reparameterization of q. E.g. using Gaussians, one can write the samples making up z as a deterministic function $z=\mu+\varepsilon*\sigma$, where $\mu$ and $\sigma$ (standard deviation) come from the parameters in q described above, and $\varepsilon\sim N(0,1)$ (standard normal/Gaussians that are simply random numbers generated by the computer). Therefore the entire dataflow can be written in terms of functions of means, sigmas, and some noise from the system.

Regarding the functional forms of the means and variances in q, one can write, e.g. $q(z_L|\mu(y,d;\theta_L), var(y,d;\theta_L))$, or such like, where ( ) indicate they are functions, and $\theta$ indicates that there are additional parameters to the function called $\theta$ (neural network weights or bias offsets per device d, etc.). For conciseness some of this precise notation may be taken as implicit.

Based on mechanisms such as those disclosed above or similar, embodiments disclosed herein thus provide a model that takes into account "mixed effects". For the present purposes, this means that parameters of the ODE are mixed in terms of their dependencies: some are global (fixed) over the entire dataset, some are dependent on sub-populations (groups/devices), and some are local and/or random that depend on the data instance or observations. The disclosed approach thus performs variation inference over time-series in a mixed-effects set-up.

After the learning phase, the VAE 401 has learned a model of the form $dx/dt=f(x, d)$, $dx/dt=f(x, u)$ or $dx/dt=f(x, d, u)$, where y is the observation of the property represented by ODE state x, and where z is the compressed latent vector describing the time series of y samples, u indicates one or more possible positive and/or negative treatments 106, d is an indication of the device 104 comprising one or more cassettes 102, and f comprises one or more tuned neural networks 405. This model can then be used in a prediction or inference phase to either a) for some given candidate device d and/or treatment u, predict what the time profile of y would be caused by that u; or b) for some desired time profile of y, infer what device d and/or treatment(s) u would be needed to cause that.

For instance, because the VAE 401 learns a q-distribution (neural network that provides parameter estimates) that is conditioned on device information, it can predict new combinations of biological parts. For example, say the networks 403, 405 are trained with devices: i) LuxR33, LasR32; ii) LuxR33, LasR34; and iii) LuxR100, LasR34. Based on this, it is possible to predict what would happen with another device incorporating some different combination of these components, such as iv) LuxR100, LasR32. This is because the encoding explicitly incorporates these labels for the biological parts, making it possible parameterise q(a|LuxR33) and q(a|LuxR100) for some parameter a.

Or more generally, because the method learns a distribution that is conditioned on information about the variant used and/or external signal applied, then it can subsequently predict the effect of new variants and/or external signals that were not included in the original observation data. E.g. because the method learns a distribution that is conditioned on device and/or treatment information, it can predict new combinations of biological components (e.g. cassettes) and/or treatments that were not trialled in the original observations.

Once the desired time profile, device d (102) and/or treatment(s) u have been predicted or inferred in the inference phase, a new product can then be generated in vitro using the device d and/or treatment(s) u inferred to give the desired time profile, or from which a certain beneficial time profile has been predicted. For instance this may be used to engineer new medicines or biofuels, e.g. comprising the protein 216 produced from the device d and optionally treatment u in question. In vitro for the purpose of the present disclosure means performed in an artificial container, outside of any human or animal body (in neither human nor animal body nor in a living plant).

In embodiments the fluorescent protein may be the actual product that is to be produced in the ultimate commercial application (e.g. the medicine or biofuel etc.). Alternatively it may just be used to model the production of some other, wanted protein. In the latter case, one option is to make a device that produces both the fluorescent protein and the wanted protein and assume the fluorescent protein is indicative of the yield of the wanted protein. Another alternative is to make a close variant that produces the wanted protein instead of the fluorescent protein and assume the two devices behave similarly.

In some embodiments, the decoder 404 comprises only one big neural network (the second neural network 405) modelling the whole right-hand side f of the differential equation. This is referred to herein as the "black box" approach. It does not attempt to assume any particular form of any equation describing how the modelled mechanism works. In this case the state x is a state of the second neural network 405. The latent vector z is encoded by the first neural network 403, and decoded by the second neural network 405.

Alternatively, in some other embodiments, a "grey box" approach is employed. In this case, the decoder 404 in fact comprises a plurality of neural networks 405 (not shown in FIG. 2). Specifically, some form is imposed on the function f in order to model, to some extent, how the modelled mechanism works. For instance, it may be assumed that the ODE takes the broad form $dx/dt = f_1 - xf_2$, where the first term $f_1$ represents cell growth (e.g. including the effect of positive factors such as one or more nutrients and/or other positive treatments) and the second term $-xf_2$ models a loss effect due to mass action kinetics (e.g. including the effect of one or more negative treatments). Each of $f_1$ and $f_2$ may be modelled as a different respective neural network (and each may be a function of x, d and/or u). This amounts to placing a constraint on the decoder 404. So each term, factor or more generally part of the right-hand side of the differential equation is modelled by a separate respective neural network. In such cases, the state x may be a state of each of one, more or all of the second neural networks 405. The latent vector z may be encoded by the first neural network 403, and may be decoded by the decoder function f as a whole, including in part by each of the second neural networks 405.

In yet further embodiments, this principle may be extended anywhere up to a "white" box, i.e. a fully "mechanistic" (analytical) assumed form of the equation describing the modelled process, with each part (e.g. each individual term and/or factor). In the white box case x is a state of the ODE modelled by the decoder but not a state of the second neural network(s) 405 per se. In the fully white box case, each of the elements of z does directly represent a real-world property, being specified by an expert in the field. E.g. each element of z may represent a different gena type. In this case $z_D$ is modified with weights of a minimal neural network and this modification of $z_D$ is put into f. Consider a function f ( ) defined in code. Each time the function f is called with z, there are D additional function calls $r1(zD_1,\theta,d) \ldots rD(zD_D,\theta,d)$ wherever they appear in the explicit formulation. E.g.:

$dx_i = 2*zD_1$ becomes $dx_i = 2*r1(z_1,\theta,d)$ $dx_j = s*zD_2 - x_j*zD_4$ becomes $dx_j = s*r2(zD_2,\theta,d) - x_j*r4(zD_4,\theta,d)$ and so on. Functions $r_d$ are small neural networks that use an element of z and neural network weights θ to modify the $d^{th}$ z element.

So the white box uses neural networks to modify some parts of dx/dt within an explicit formulation of dx/dt (the prescribed model). The grey or black-box will replace more or all of the RHS's with neural network outputs, e.g. $dx = f_1(x,z,d,\theta,u) - x*f_2(x,z,d,\theta,u)$ The advantage of a white or mechanistic approach is that it enables an interpretation to be placed on the learned parts of the equation. If the modelled form of the equation is accurate, it may also lead to more accurate results. However, a downside is that it has the potential to suffer from misspecification. I.e. there may be unknown effects not modelled by the presumed form of the equation. A fully black box approach does not suffer from the misspecification issue, but is not interpretable. E.g. it could predict negative values of x which cannot be interpreted meaningfully as a real cell density. But on the other hand the block box approach could reveal new phenomenon that would be missed by the white box approach if misspecified. An advantage of the grey box approach is that it provides a balance between these two approaches.

Figure 6:
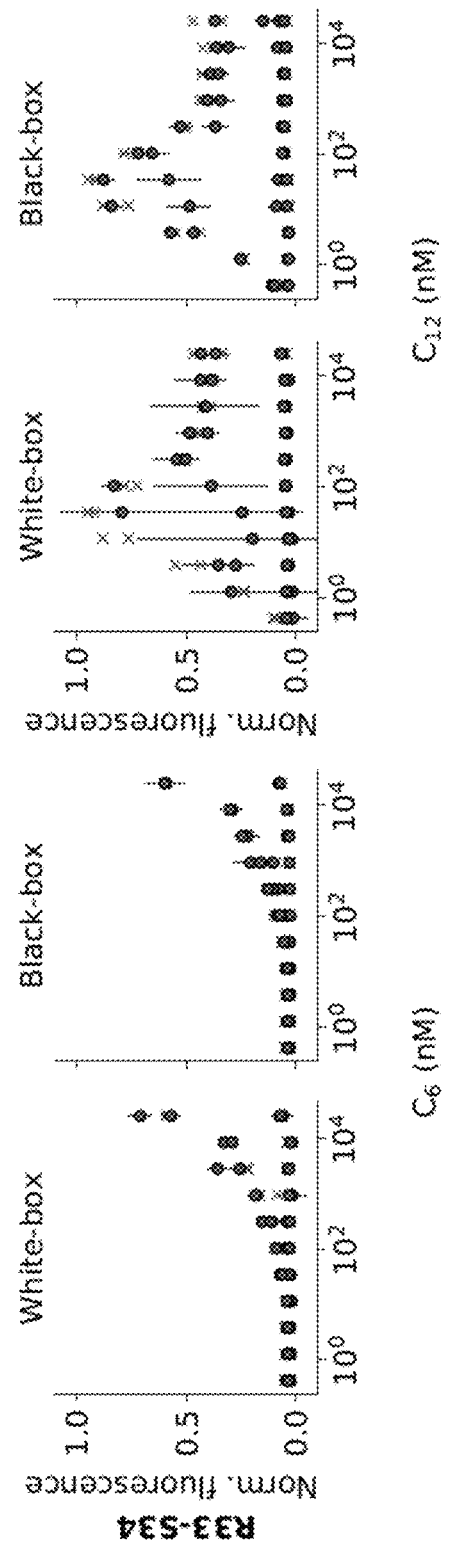
FIG. 6 is an example predicted model response to input signals in held-out device inference.
Figure 7:
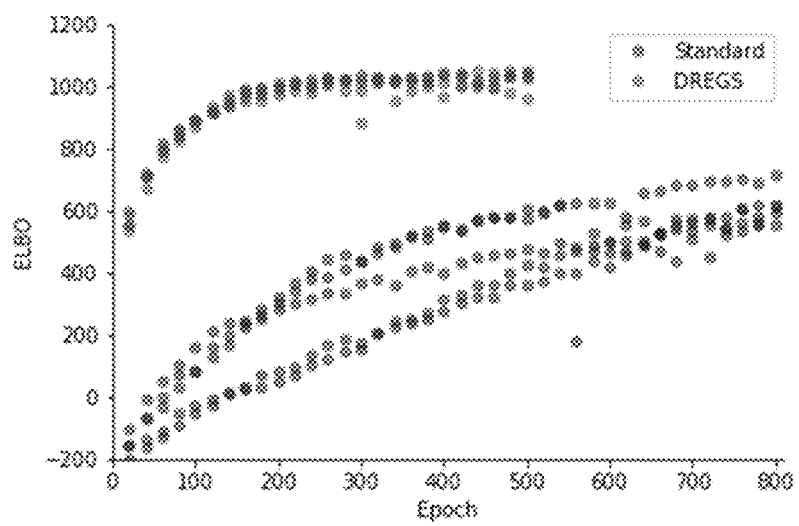
FIG. 7 shows how the convergence of the ELBO is improved by the DREGS estimator. Shown are 5 independent evaluations of the VI method applied to the prescribed constant model, using the standard gradient estimator and the DREGS estimator. Each reported ELBO score is the average of a 4-fold crossvalidation at a given epoch.
Figure 8:
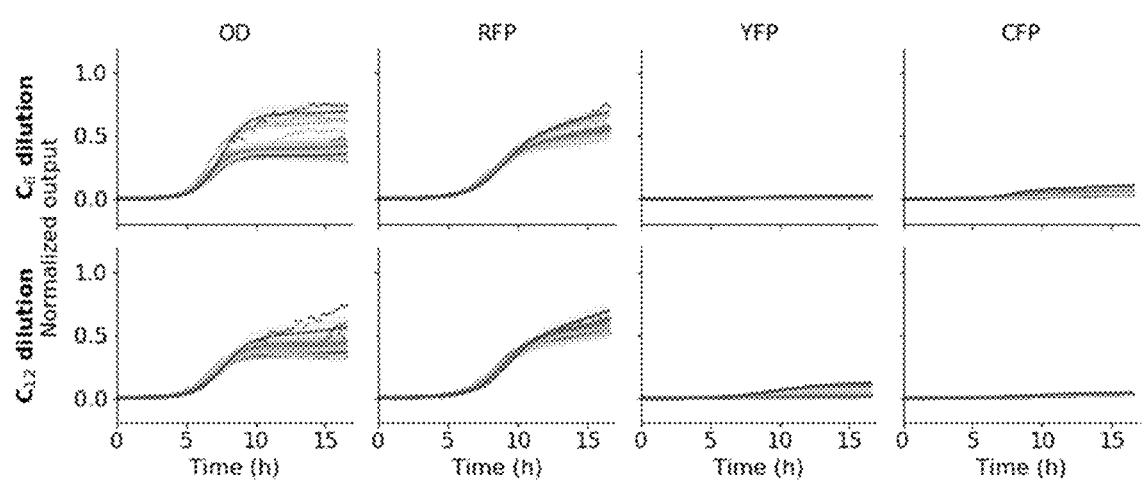
FIG. 8 shows example model summaries by device.
Figure 9:
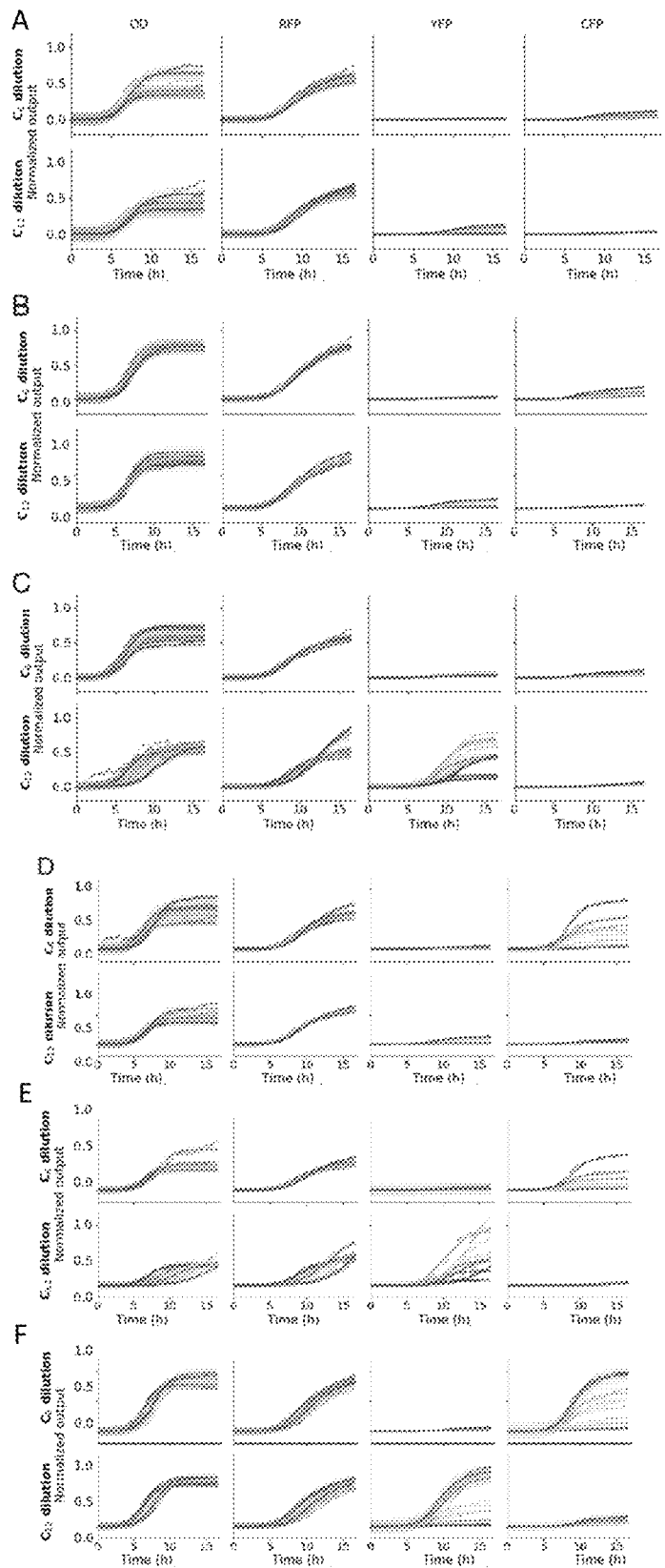
FIG. 9 shows example summary plots for the constant model.
Figure 10:
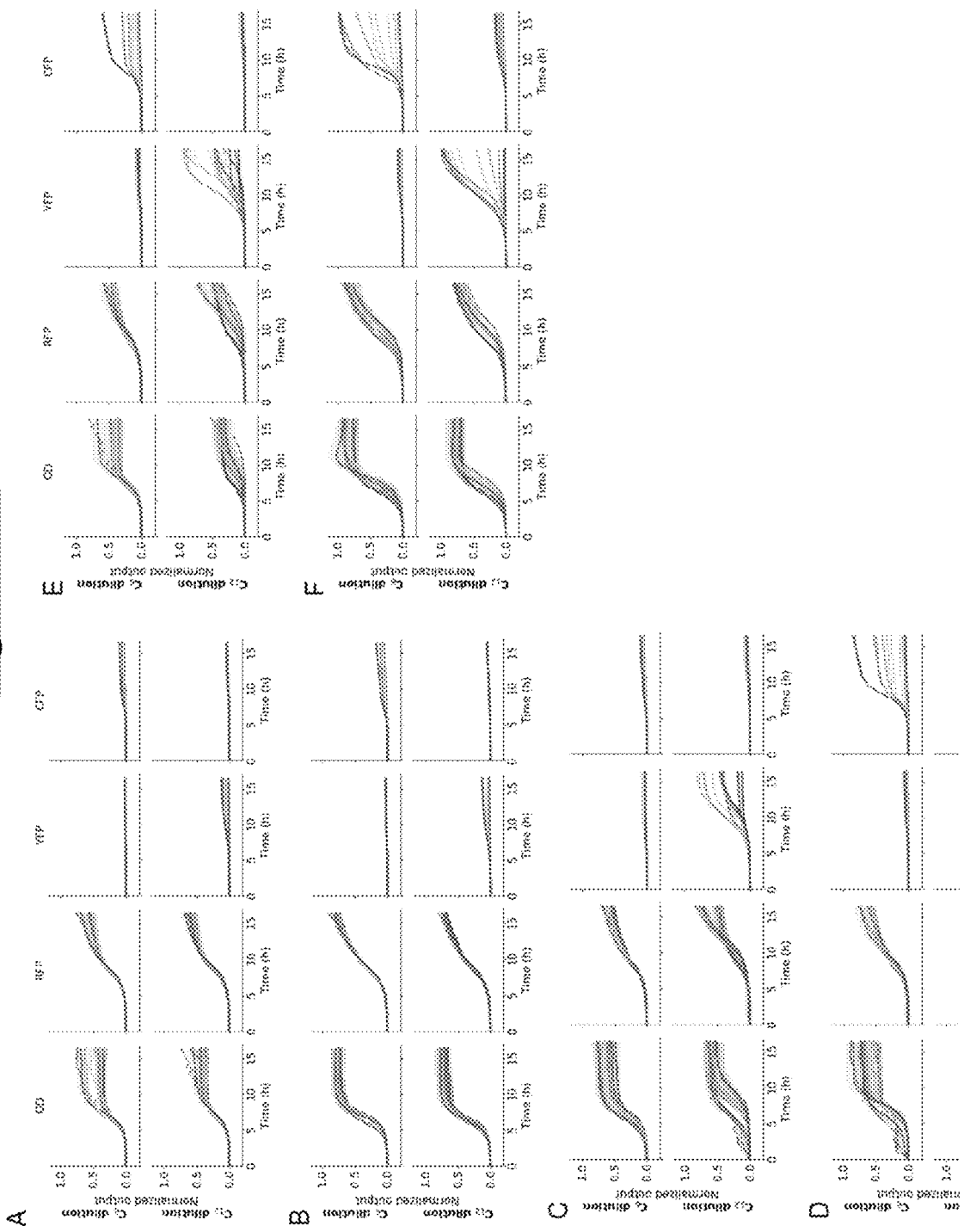
FIG. 10 shows example summary plots for the black-box model.
Figure 11:
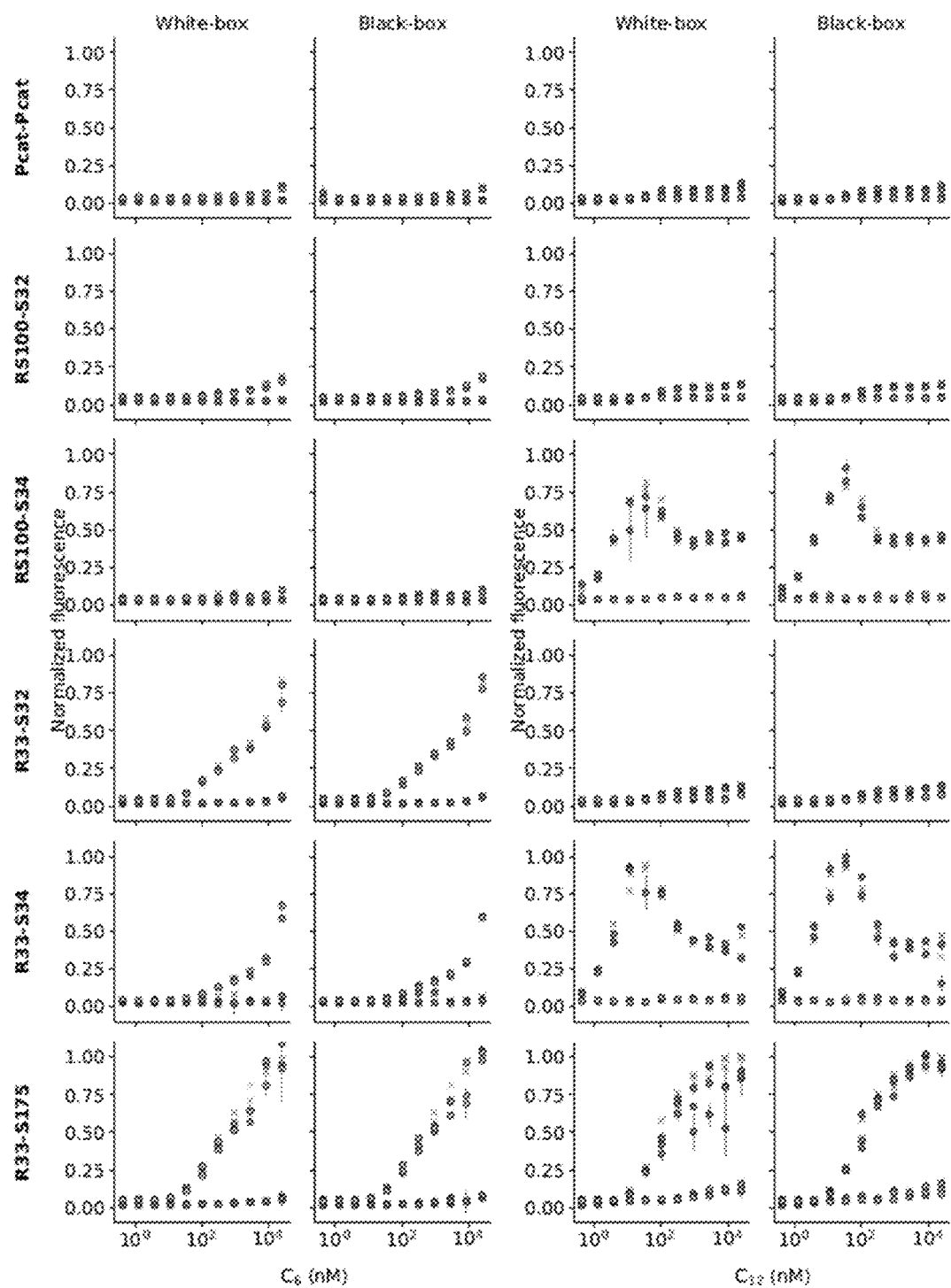
FIG. 11 shows example treatment response plots.
Figure 12:
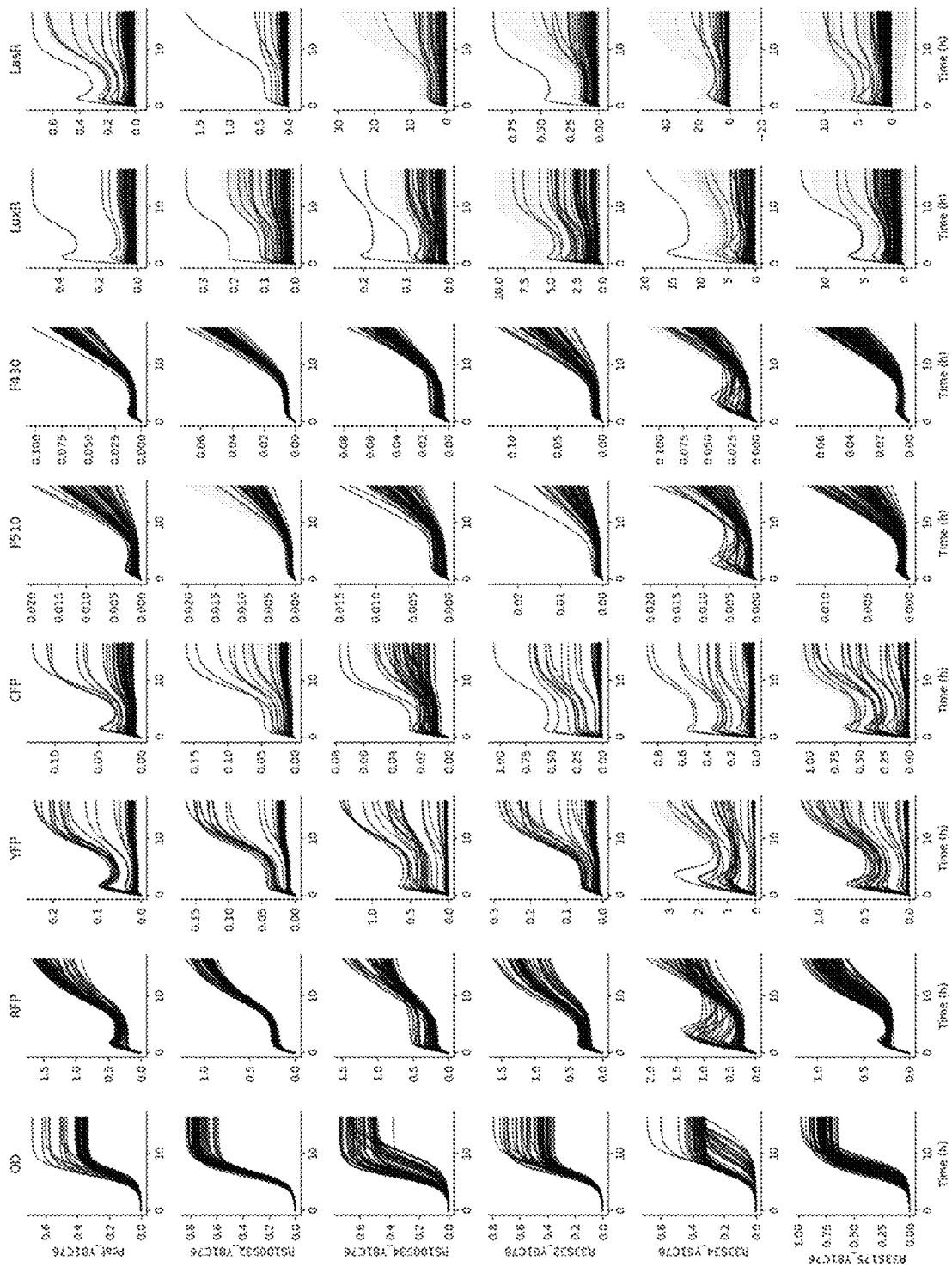
FIG. 12 shows example predicted concentration dynamics of the hidden species (x) in the constant model.
Figure 13:
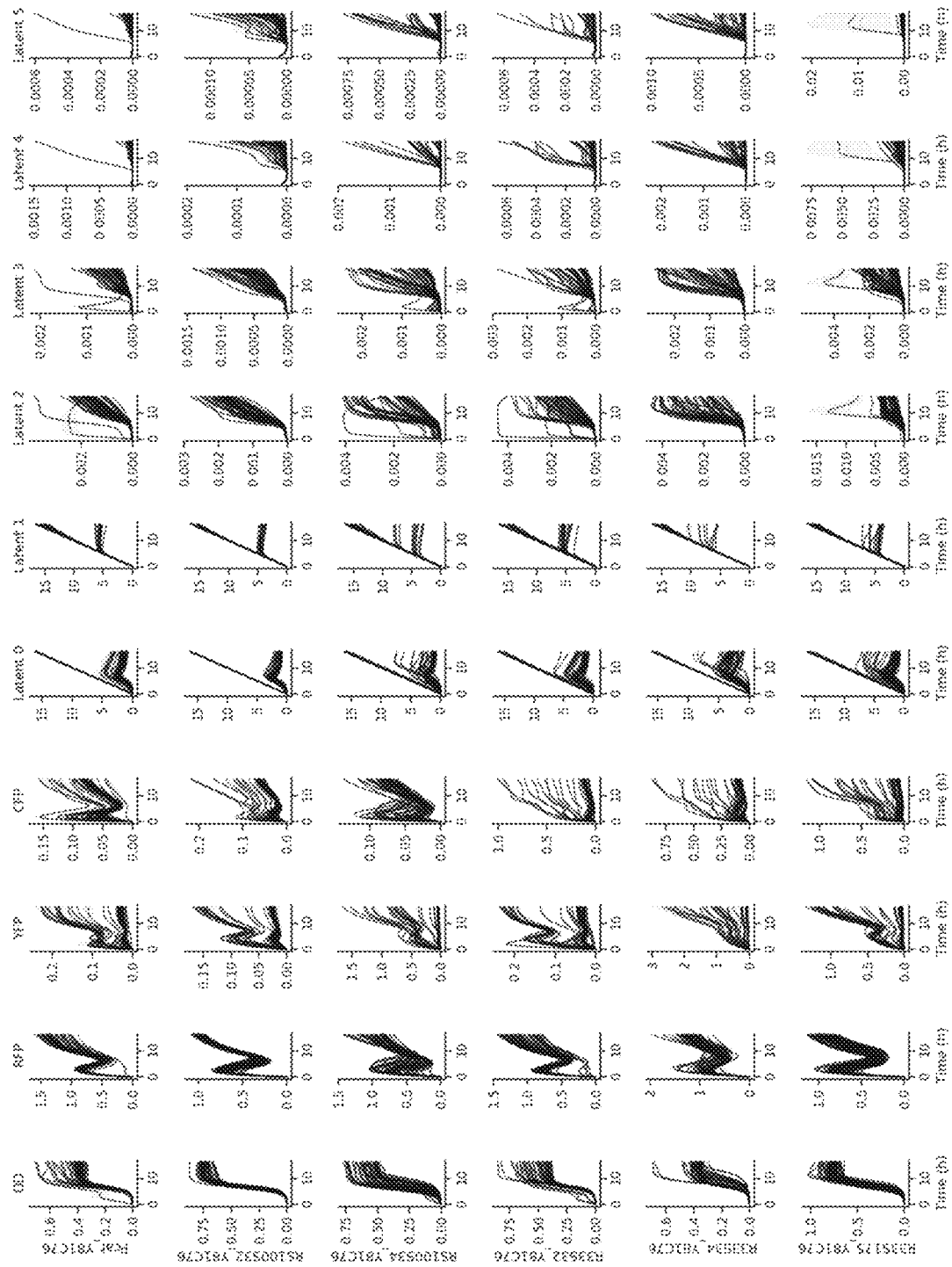
FIG. 13 shows example predicted concentration dynamics of the hidden species (x) in the black-box model.

In the previously proposed use of a VAE to model an ODE by Chen et al, they only perform inference over the initial state at t0 (see section 5 and FIG. 6 of Chen, remembering that the notation x and z are used differently in Chen than herein). They then solve an ODE with this initial state, a set of neural network weights $\theta_f$, and a neural network called f, which provide dx/dt. In the present disclosure on the other hand, z directly represents the parameters of the ODE over which variational inference is performed. The parameters of the ODE are uncertain at local device and/or global level. The states are represented as x and the observations are y (Chen: states z, observations x). In embodiments of the present disclosure, the initial state $x_{t0}$ is not especially important and therefore may be set to a small initial value (though this could be inferred as well). The white-box model has a fixed function f (defined by domain expert), but the method tests samples z~q as part of the VAE 401. The presently disclosed black-box version also uses z~q in f, but also learns the parameters of the neural network $\theta_f$. Further, Chen et al only assume uncertainty over the initial state of the ODE, whereas in embodiments disclosed herein, the model assumes uncertainty over global, local, and device dependent sets of parameters in z. In terms of ODE inference, Chen's approach is limited and more of a maximum likelihood estimator of ODE parameters.

Further exemplary details are described below.

Some embodiments provide a scalable Bayesian inference framework for nonlinear dynamical systems characterised by hierarchically defined blocks of latent variables, commonly defined at the individual, group, and population-levels. Specifically, Bayesian inference for such nonlinear dynamical systems, including nonlinear mixed-effects (NLME) dynamical systems—the workhorse for many experimental sciences—are cast as stochastic gradient descent in an end-to-end differentiable, block-conditional, variational autoencoder. The dynamics may be captured by specifying the data-generating process as ordinary differential equations (ODE) and a modified-Euler solve of the ODE. The ODE and solver may be fully-differentiable, and as such allows for seamless scaling-up and accelerating of inference and learning for nonlinear dynamical systems to multiple, experimentally related datasets. Moreover, some embodiments permit the ODE right-hand sides to include a mixture of user-prescribed (white-box) terms and neural network-based (black-box) terms. The proposed framework may be validated by learning the parameters of NLME ODEs that describe synthetic signalling systems in bacteria. The approach learns an order of magnitude more quickly than prior approaches, and extends the model class in a flexible, interpretable manner.

Ordinary differential equation (ODE) models derived from biological experiments play a key role in advancing our understanding of biology. Seminal contributions include understanding the biological mechanisms of the cell cycle, circadian rhythm, cardiac rhythm, signalling cascades and nerve action potentials. This biological understanding in turn has the potential to unlock new treatments for a broad range of diseases that still plague humanity today. ODE models are also playing an increasingly important role in our ability to engineer biological systems, commonly referred to as Synthetic Biology. They provide sufficient mechanistic detail both to identify potential targets for molecular intervention and also to predict the possible outcomes of these interventions. The ability to engineer biology has the potential to enable substantial breakthroughs in medicine, food and energy, and to provide sustainable alternatives to a broad range of existing processes and products that currently cause substantial environmental damage.

However, the ability to learn ODE models from biological experiments is currently limited by the efficiency and scalability of existing inference methods. Inference of ODE model parameters via Markov Chain Monte Carlo (MCMC) methods, often regarded as the state-of-the-art, requires substantial computational overhead. This may be needed for randomly sampling parameter values, simulating the system of ODEs, computing the error between simulation results and experimental data, and repeating the process hundreds of thousands of times to ensure that parameter distributions are accurately approximated. Using this approach, even simple systems with a few dozen parameters can require days of computation. Despite Monte Carlo being a popular methodology for parameterizing models from experimental data, more modern advances in machine learning could significantly improve these existing workflows. In addition, the selection of an ODE model from a set of candidates, each representing a competing biological hypothesis, is cumbersome. Furthermore, in many cases the precise biological mechanism is only partially known, such that manually formulating an appropriate ODE model that is consistent with biological experiments remains a challenge. As a result, there is a growing need not only to learn ODE model parameters for known biological mechanisms, but also to learn the underlying mechanisms themselves in a systematic manner. Finally, in the general case it is desirable not only to learn an ODE model for a single biological system, but also to learn models for a set of systems with shared components. Examples include a set of individuals with shared genetic traits, a set of cell types (such as lung, liver and heart) with shared processes such as the cell-cycle, or a set of engineered bacterial cells with shared genetic devices. This requires inferring ODE models not only for each system in the set, but also for each of the shared components, in a consistent manner.

Some embodiments provide an efficient method for learning ODE model parameters from experimental data that also supports grey-box modelling, such that ODE models of previously unknown biological mechanisms can be inferred from biological experiments in a systematic manner. The method relies on reparameterized variational inference, and performs scalable Bayesian learning by leveraging fully differentiable inference through a variational autoencoder. This enables fast parameter inference while parsimoniously trading off between model fit and generalisability. The generator may be a modified-Euler solution to an ODE whose parameters are samples from the variational distribution. Some embodiments involve backpropagation directly through the ODE solver during learning. Within the same framework, prescribed white-box ODE models are interchangeably compared with carefully constrained black-box ODE models—and as such could be viewed more as grey-box models—that use neural-network sub-components to define ODE RHS's. By doing so, this may support scientists wishing to improve model performance while maintain a useful degree of interpretability over their models. Scientists can therefore focus on scaling inference and experimental design, rather than the precise details of mechanistic models, accelerating research in their specific domain.

To address the general case of learning ODE models for a set of biological systems with shared components, the method supports ODEs with nonlinear mixed-effects (NLME). This enables a distinction between fixed and random effects, where a fixed effect is consistent across systems and can be used to represent shared components, while a random effect varies between systems. This definition is adopted from the multilevel modelling literature and is equivalent to hierarchical nonlinear models. Some historical statistical modelling literature contains alternative definitions, though standardization of software packages has helped resolve some of this ambiguity. NLME ODE models have been used extensively in pharmacokinetic and pharmacodynamic applications, and have also been used to interpret cellular variability in biological processes. Commonly used software packages include NONMEM, Monolix and nlmeODE.

In some embodiments, the model class and inference method supports interpretability. Defining the RHS of the ODE within an auto differentiation framework facilitates comparison across a spectrum of model interpretability. In the white-box case, a domain expert may explicitly define the differential mechanism along with appropriate and meaningful variable distributions. In the fully black-box case, the RHSs are defined as the outputs of a neural network and use non-interpretable (a priori) mean-field Gaussian latent variables; fully black-box models provide the best data fits, including out of sample predictions, but cannot be interpreted meaningfully with respect to the underlying biology. A flexible modelling compromise uses neural-network sub-components in the RHS but includes domain-specific constraints (such as biological plausibility) on the architecture of the network and the observer process. This grey-box approach provides improved data fits and does so in a manner amenable to model improvement and checking by a domain expert. In providing such partially interpretable models, embodiments may bridge the gap that model mis-specification leaves scientists, giving them guides for improving explicit model specification.

Through a careful empirical study of a real-world dataset, it has been demonstrated that the method may: learn an order of magnitude more quickly than previous approaches; enable rapid closed-loop investigation of mechanistic models of physical phenomena; and support interpretability by plotting the interactions between the learned components of the model, i.e. it is demonstrated how simple structural constraints can be applied to ODE models with neural network right-hand side functions to improve their biological plausibility whilst enabling better inference characteristics.

The following will describe the method for inferring parameters of models ranging from an explicit mechanistic model to a completely black-box neural-based mixed effects model, where the dynamics are specified by an ODE. The approach is applicable to the general case of learning ODE models from biological experiments. The proposed model class and inference for hierarchical models is a simple yet powerful way of combining multiple datasets generated under varying experiment conditions in a single objective.

The following demonstrates how ODE models for a plurality of systems with shared components can be simultaneously inferred from data. Since some components are shared across all systems, and some are unique to particular systems, a nonlinear mixed-effects formulation is effective for sharing statistical strength. Additionally, examples make use of fast, scalable amortized inference to enable certain parameters to take on different values for each occurrence of a component in a given system, essentially enabling multiple levels of random effects to be accounted for in the framework. Therefore, by applying parameter inference techniques, reusable components can be quantified, and the dynamical behaviour of novel combinations of such components can be predicted.

In summary, embodiments make the following contributions: scalable, amortized, Bayesian inference of hierarchical parameters of nonlinear ODE systems. Within the same framework, flexibly prescribed differential equations, from fully mechanistic white-box to fully neural-network based black-box. Neural sub-functions within right-hand sides allows interpolating between mechanistic (white-box) and general parametric (black-box) models for "grey-box" learning. This allows, among others, automated identification components of mechanistic models that are misfit or underspecified. Zero-shot learning for mixed-effect ODEs by leveraging compositionality of group variables.

The following describes a method for learning hierarchical ODE models from experimental data. The method considers a set of systems with shared components.

Hierarchical ODE Models (NLME)

The formulation of NLME ODE models may be expanded to consider a more general hierarchical structure:

$$\frac{dx}{dt} = f(x; z, u, d) \quad (1)$$

$$Y = g(x)$$

where $x \in \mathbb{R}^{n_x}$ is the internal state (often including non-observable quantities, like the concentrations of molecules).

f formalizes how the $n_x$ internal states evolve over time, in response to control variables u, and is parameterised by z. A vector d identifies groups to which the individual belongs, which enables selected variables in z to have group-specific values. For example, consider measurements of a population in which individuals share common genes/haplotypes. The parameterization of individuals within such groups might share more parameters than individuals belonging to different groups.

Each data instance n is comprised of M observed timesseries each of length T, which may be represented as a M×T-dimensional matrix $Y^{(n)}$. Observations at a single time-instance k will be an M-vector $y_t$, so that each Y= $[y_1, \ldots, y_T]$; note every $y_t \geq 0$. A batch of B observations is a B×M×T three-tensor. In a general nonlinear mixed effects dynamical model, $Y^{(n)}$ represents the dependent variable of interest, where each $y_{t+1}$ depends on $y_t$ through some transition function specified by the dynamical system.

In order to capture the hierarchical relationship between random variables, shared across subsets of the observations, suitable indicator random variables are designed. The hierarchical structure in the experimental design data determines the particular choice of indicator representation.

Each observation $Y^{(n)}$ belongs to a group (sub-population) of individuals. To capture multiple group membership through model stratification, a multi-hot representation of concatenated one-hot vectors for individual group membership is used. If group structure is simpler, then a single one-hot is sufficient, but if multiple and overlapping group structure is present, interesting zero-shot learning of unseen combinations is possible, as demonstrated below.

Let a sub-population be indexed by the vector $c_S$, where a member of that group exhibits 1 of $K^{(s)}$ variations. Hence, a group $c^{(s)}$ as $K^{(s)}$-dimensional one-hot vectors with scalar entries is represented as:

$$c_k^{(s)} = \begin{cases} 1 & \text{if } c_s = k \\ 0 & \text{otherwise} \end{cases}$$

and a group identifier as the concatenation of S group one-hots:

$$d = [c^{(1)}, c^{(2)}, \ldots, c^{(S)}]$$

In this way, group membership for a data instance n is indicated by $d^{(n)}$. This representation is mathematically convenient for inducing conditioning in an amortised inference scheme, in a way that will be explicated throughout the remainder of this section.

Finally, $u^{(n)}$ denotes the experimental conditions for device $d^{(n)}$. For modelling contexts in which no control input is present, this vector can be removed from the modelling context entirely without affecting validity or correctness. In general, u is a vector that typically represents different initial conditions such as different quantities of input signals that perturb a system under observation, giving rise to observable changes in output signals. When available, it can provide a valuable knob for interpreting what the model has learned.

Auto-Encoding Mixed-Effects Models

An example inference method is amortised stochastic variational inference with a reparameterised variational distribution. In the simplest version of these latent variable autoencoder models, a mean-field Gaussian prior distribution p(z) is assumed, along with generative $p_\theta(y|z)$ and variational q(y|z) distributions whose parameters—generally the means and variances of diagonal Gaussians—are set to the outputs of neural networks. The weights of the neural networks, denoted by $\phi$ and $\theta$ are adjusted to maximize the evidence lower bound (ELBO) of the log marginal data likelihood:

$$\log p(Y) \geq \mathbb{E}_{q_\phi(z|Y)} \left[ \log p_\theta(Y|z) - \frac{\log q_\phi(z|Y)}{p(z)} \right] \quad (2)$$

The ELBO can be rewritten as an expectation over standard normals by reparameterizing draws from q; for example for latent variable i, $z^{(i)} = \mu^{(i)} + \varepsilon \cdot \sigma^{(i)} = h(\mu^{(i)}, \sigma^{(i)}; \varepsilon)$ where $\varepsilon \sim N(0, 1)$. Stochastic VI updates $\phi$ and $\theta$ by gradient ascent on the ELBO computed using mini-batches of data, injected standard noise, and using the reparameterization $h(\mu, \sigma; \varepsilon)$. Reparameterized may learn to simulate data but such techniques are equally applicable when the generative process is a prescribed mechanism, i.e. in likelihood-free inference.

To model mixed-effects block-factorization is exploited in a mean-field approximate posterior q by changing the dependencies in the mean and variances of the q-distributions in a block-wise fashion. For local blocks the q distribution will depend on observations via a neural network; for population blocks the q-distribution parameters assume no dependencies, and sub-population-level blocks of q will depend on population sub-group indicators. To do this formally, the conditional VAE (CVAE) may be used for structured output prediction.

The following lower bound on log p(Y|d, u) is optimized:

$$\mathbb{E}_{q_\phi(z|Y,d)}[\log p_\theta(Y|z,u,d) + \log p_\Theta(z) - \log q_\phi(z|Y,d)]$$

Experimental controls u, when present, are modelled as conditionally independent in the variational posterior, e.g., $z \perp u|Y$. The interpretation of a CVAE in the context of multilevel statistical models is discussed below.

Block-Conditional Encoders

Multilevel models in stochastic variational inference could be expressed through a hierarchical structure within the variational distribution. For nonlinear mixed-effects models, hierarchical structure within the dependent variable rather than the approximate posterior is important. Hence, the computationally-convenient fully factorized approximate posterior may be kept, and conditioning through a blockfactorization may be induced.

The mean-field approximate posterior is factorized into three blocks: random variables $z_L$ local to each observation, which depend on both the observation $Y^{(n)}$ and indicator $d^{(n)}$; device-dependent random variables $z_D$, which depend only on the device identifier $d^{(n)}$; and global, population-level random variables $z_G$, independent of both input data and devices.

Hence, the conditional variational distribution $q_\phi(z|Y, d)$ factorizes into:

$$\prod_l q_{\phi_G^{(l)}}(z_G^{(l)}) \prod_k q_{\phi_L^{(k)}}(z_L^{(k)} | Y, d) \prod_j q_{\phi_D^{(j)}}(z_D^{(j)} | d)$$

which permits a hierarchical (or mixed effects) structure in the dynamical system through the specification of each dimension in the decoder.

The parameters $\phi_G$ are independent of the observations Y, and are real scalars r and v such that $$q_{\phi_G^{(l)}} = \mathcal{N}(r_l, \exp\{v_l\}),$$

that is, $v_l$ in optimized in an unconstrained space interpreting it as the log standard deviation. The variables $r_l$ and $v_l$ are initialized to an arbitrary but reasonable value (as determined by a domain expert; initialized to the prior), and then optimized through gradient descent to maximize the conditional ELBO.

The parameters $\phi_D$ are independent of Y but determined by d. d is used to pick out the associated entries from learnable vectors $w_{\mu_-}$ and $w_{\sigma_-}$ such that $$q_{\phi_D^{(j)}} = \mathcal{N}(h(w_\mu d_j), \exp\{h(w_\sigma d_j)\})$$

sharing each mean and standard deviation within sub-population groups.

The parameters $\phi_L$ consist of pairs of weights and biases of deep neural networks for each of the k dimensions, $\xi^{(k)}$ and $\eta^{(k)}$, such that $$q_{\phi_L^{(i)}} = \mathcal{N}(m_\xi^{(k)}(Y,d), s_\eta^{(k)}(Y,d))$$

The m and s functions are deep neural networks whose first layer is a strided convolution over Y. The output of the first layer is a vector to which d is concatenated. This concatenated vector is then mapped into one dimension using a fully-connected network. The indicator random variables in d induce hyperplane separations of the input layer CNN, as in classical regression models. To ensure positivity for s, the final layer has an exponential nonlinearity (that is, the pre-activation neuron of the final nonlinearity is in log space, so that the post-activation lives in $\mathbb{R}^+$).

The convolutional neural networks in m and s can be thought of as implementing adaptive basis discovery for random effects. Moreover, amortized inference is implemented concretely through m and s, since $\xi$ and $\eta$ are learned over mini batches of the observed data. The alternative would be optimising parameters local to each datapoint, both during training and test time, as in non-amortised stochastic variational inference. This would be prohibitively expensive for the model class proposed, which is designed to scale with massive amounts of data.

Block-Conditional ODE Decoder

The mixed effects probabilistic structure induces a conditional log-likelihood as well. Some examples relate to ODE models of the form described by Equation (1). Such models incorporate an observer process as well as latent evolution process. If no observer process is relevant, then the observer process is the identity function.

The key to applying a mixed effects model in this case is to interpret the draw from the variational posterior as the parameters of the ODE with some arbitrary initial conditions. If experimental treatment u is part of the model, it must be included here in the ODE solver, since the evolution of the latent state and the observer process itself are causally affected by it.

The variational posterior allows for the learning of multiple levels of random variables over a fully mechanistic differential model of a physical process. Given some system of ODEs the multilevel structure can be seen as $$\frac{dR}{dt} = a_R - (d_R + \gamma(c_i))R$$

where i indexes the datapoint. The $a_R$ variable is local to the subpopulation that datapoint i belongs to, the $d_R$ variable is shared across the entire dataset, and the $\gamma(c_i)$ variable is local to this observation. Any experimental treatment u will appear as terms the ODE system.

In order to induce device-dependent conditioning in a whitebox decoder likelihood for samples from $z^j$, the sample is offset with a learned scalar: $z^{(j)} + b^T d_i$ for some datapoint i. The device one-hot encoding $d_i$ picks out appropriate entries in the learnable vector b. This provides a channel for the samples from q to vary according to device-specific gradient information.

Alternatively, the f function can be chosen to be some deep neural network that takes as input at each time step the parameters sampled from q, and the previous state. In order to distinguish between fixed parameters of the system and the evolution of the hidden state x, as in the white box model, at each time step the sample from q is held fixed and only the latent state x is permitted to vary.

Mapping X through the observer process g completes the simulation of the observed Y. The observer process may be modelled as subject to a measurement noise with covariance $S = \text{diag}([\sigma_1, \sigma_2, \sigma_3, \sigma_4])$ so that $g(x_t) \sim \mathcal{N}(\mu = y_t, \Sigma = S)$. Each $\sigma_i$ is learned independently through a neural network identical to the s function.

Optimisation

Given for an arbitrary but fixed sample from the conditional approximate posterior, the ODE may be solved as follows. For an initial $x_0$ and fixed step-size $h = t_{j+1} - t_j$ for arbitrary $j < T$, one may model $x_t = x_{t-1} + hf(x_{t-1}, u, z, d)$. A variety of other solver methods from the Runge-Kutta family were experimented with, including adaptive-step solvers, but they had little effect on training or the solution found, possibly due to the stochastic gradient descent optimization procedure. The f function is specified for the white-box model through the designed equations (5) or learned using gradients of the evidence lower bound through a recurrent neural network for the black-box model.

During training a K-sample (K=100) important weights autoencoder (IWAE) estimator may be used for gradient computation. Doubly reparameterized gradients (DREGS) may be used, which have been shown to yield lower-variance gradient estimates than IWAEs, and avoid the known problem of poor gradients for the variational approximation with greater numbers of importance samples. DREGs were compared with K-sample VAE gradients and found to converge on higher ELBOs with fewer epochs, especially for white-box models, but also marginally improved black-box models (similar efficiency and ELBOs). For evaluation, the following reports IWAE ELBOs using K=1000 samples.

Synthetic Biology Case Study

The approach may be applied to the characterization of synthetic genetic circuits, engineered to respond to an input with a desired output. Such circuits are typically created by introducing DNA into organisms that codes for proteins that bind to regulatory DNA sequences that control the production of other proteins. By 'wiring up' these interactions in cells, a synthetic biologist can build information processing systems that function like Boolean logic gates, like analog electrical circuits, or that mimic the behaviour of natural biological systems. While a design environment exists for scalably building transcriptional logic circuits with predictable Boolean behaviours, existing approaches for constructing circuits with dynamical behaviours are still in their infancy. The quantitative behaviour over time of biological circuits cannot currently be predicted from DNA sequence alone, so experiments must be performed to measure key properties to understand the dynamics of these systems and to allow rational design decisions about future circuits.

Circuit Design and Data Collection

The synthetic genetic circuits used may be built from gene cassettes comprised of DNA sequences encoding a promoter, ribosome binding site, coding region, and terminator. These cassettes are assembled into plasmids that are used to transform E. coli cells. A collection of cassettes that implement a particular design are referred to as a device. In some examples, the devices are all double receiver devices that respond to 3-oxo-C6-homoserine lactone (C6) by producing cyan fluorescent protein (CFP) and to 3-oxo-C12-homoserine lactone (C12) by producing yellow fluorescent protein (YFP). These devices may be built of 4 cassettes: one each for producing LuxR and LasR proteins, the receiver proteins that bind C6 and C12, respectively, a CFP cassette activated by C6-bound LuxR, and a YFP cassette activated by C12-bound LasR. The devices may vary in the strength of the ribosome binding sites in the LuxR and LasR cassettes, creating devices that vary in the amount of each of those proteins expressed and therefore their sensitivity to C6 and C12.

Modelling Synthetic Biological Circuits with ODEs

The general approach for constructing prescribed models of biological circuits combines a population-level model for cell colony growth with more detailed models for the concentrations of intra- and intercellular molecules, and resembles the approach commonly used in the synthetic biology literature. Cell growth models are generally described by the product of the current cell density $c(t)$ and the specific growth rate $(c(t))$, which describes both the per capita growth rate and the decrease in intracellular concentrations due to an increased volume. To model the cellular biochemistry, chemical reaction networks may be translated to ODEs using mass action kinetics, which assumes that reactions fire at a rate proportional to the concentration of the reactants. Translating chemical reactions in this way in general leads to a large number of equations, because all mRNAs, proteins, small molecules and complexes between each produce their own equation. As such, model reductions are commonly applied to reduce the number of dependent variables, but result in more complex nonlinearities.

In some embodiments, the number of species M=4, representing the optical density (OD), bulk red fluorescence (RFP), bulk yellow fluorescence (YFP), and bulk cyan fluorescence (CYP). The number of components that produce measurable observations S=2, and represent promoters which activate the production of fluorescent proteins YFP and CFP. The vector u represents the treatment of the chemical concentrations of signalling molecules C6 and C12, applied to a particular bacteria colony for the duration of an experiment.

FIG. 3 is a schematic view of the data generating process for the synthetic biological circuits according to embodiments. A) Exchangeable device components (aka cassettes) are selected and inserted in to the plasmid of the bacteria. Here are shown two types of components, each of which have several variations. The joint selection of components defines a device. B) The bacteria with the selected device is then replicated and then grown in wells (circles) within an experimental plate. Wells are then treated with chemicals (here are shown the product of applying two treatments) and grown for approximately 24 hours. C) During the growing period, cameras capture the optical density (OD) and three fluorescent wavelengths which represent the activity of three fluorescent proteins: RFP, YFP, CFP The model used in numerical experiments was discussed above, but part of it is repeated here to give examples of parameters at each point in the parameter hierarchy. Cell density may be modelled using a lag-logistic model, which is similar to the aforementioned logistic model, but considers the growth rate to be 0 until a time $t_{lag}$ is reached. Because cell growth might differ in cells containing different devices and subjected to different treatments, local parameters r, K and $t_{lag}$ are used. So, for cell colony i, the cell density $c_i$ evolves according to $$\frac{dc_i}{dt} = c_i \cdot \gamma(c_i)$$

where the specific growth rate $\gamma$ is defined as $$\gamma(c_i) = \begin{cases} r_i \cdot \left(1 - \frac{c_i}{K_i}\right) & t > t_{lag,i} \\ 0 & t < t_{lag,i} \end{cases}$$

The model of how C6 and C12 stimulate production of YFP and CFP involves explicitly describing the concentration of LuxR and LasR, the two proteins that are expressed by each double receiver circuit. Each circuit has a different combination of rbs sequences associated with LuxR and LasR expression, which can therefore be modelled using device-conditioned variables $a_R$ (rate of LuxR synthesis) and as (rate of LasR synthesis). As such, the equation for LuxR is given by $$\frac{dR}{dt} = a_R - (d_R + \gamma(c_i))R$$

where $a_R$ is a device-conditioned parameter. Equivalently, the cellular rate of LuxR degradation parameter, $d_R$, is a global parameter.

$$\frac{dx}{dt} = N_1(x) - N_2(x)$$
$$\frac{dx}{dt} = N_1(x) - N_2(x) \cdot x$$

Experiments

Datasets from 6 devices were combined, each of which contained measurements of cell colonies incorporating a device in response to a C6 or C12 treatment. In total, the combined dataset included 312 time-series measurements, each containing four measured signals over approximately 100 time-points. In principle, the goal of characterization is to learn the effects of C6 and C12 treatment on each device, but along way establish parameter estimates with uncertainty, to enabled predictions of other devices to be made.

Two inference experiments were considered. In the first, the combined dataset was split into cross-validation folds and a block-conditional white-box model was compared with a black-box model using biologically plausible constraints on its functional form. In the second experiment, the combined dataset had one device held out as a test dataset, while the remaining devices undergo cross-validation for model selection. This experiment was performed on devices whose components had not appeared in combination together, but had appeared with other cassettes in other devices, enabling their parameters to be identified.

Multiple Device Inference

Figure 4:
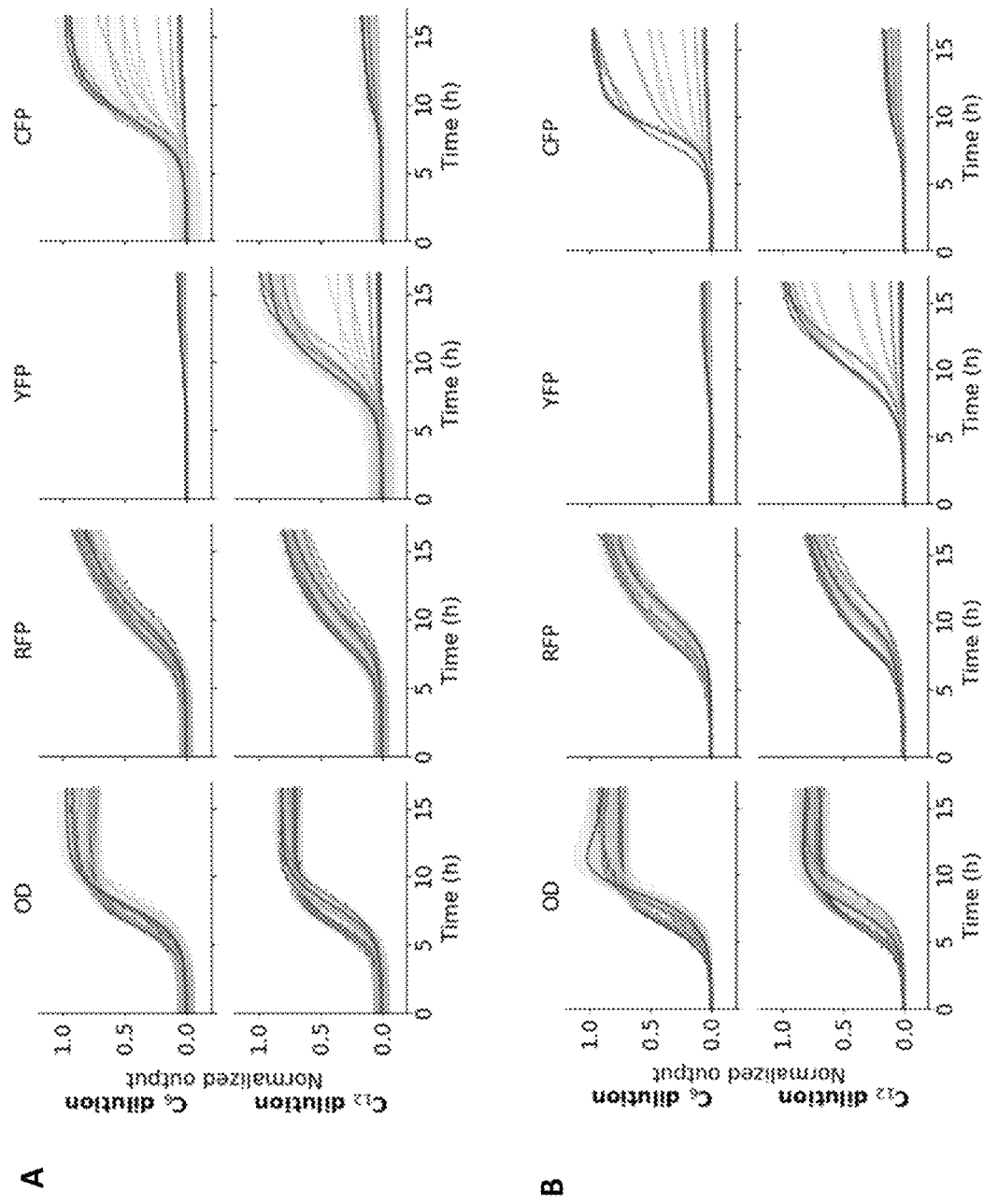
FIG. 4 shows example posterior predictive distributions for a R33-S175 device.

A 4-fold cross-vualization with 500 epochs and batch size 36 (see FIG. 4) was ran. FIG. 4 shows Posterior predictive distribution for the R33-S175 device. Cross-validation of (A) the mechanistic model, and (B) the blackbox model is illustrated for a small portion of the data. Specifically, only data for the R33-S175 device is selected, and only one of each replicated treatment is selected, so that full dilution series can be visualized for C6-HSL and C12-HSL, which sweeps from low to high YFP/CFP expression.

Figure 5:
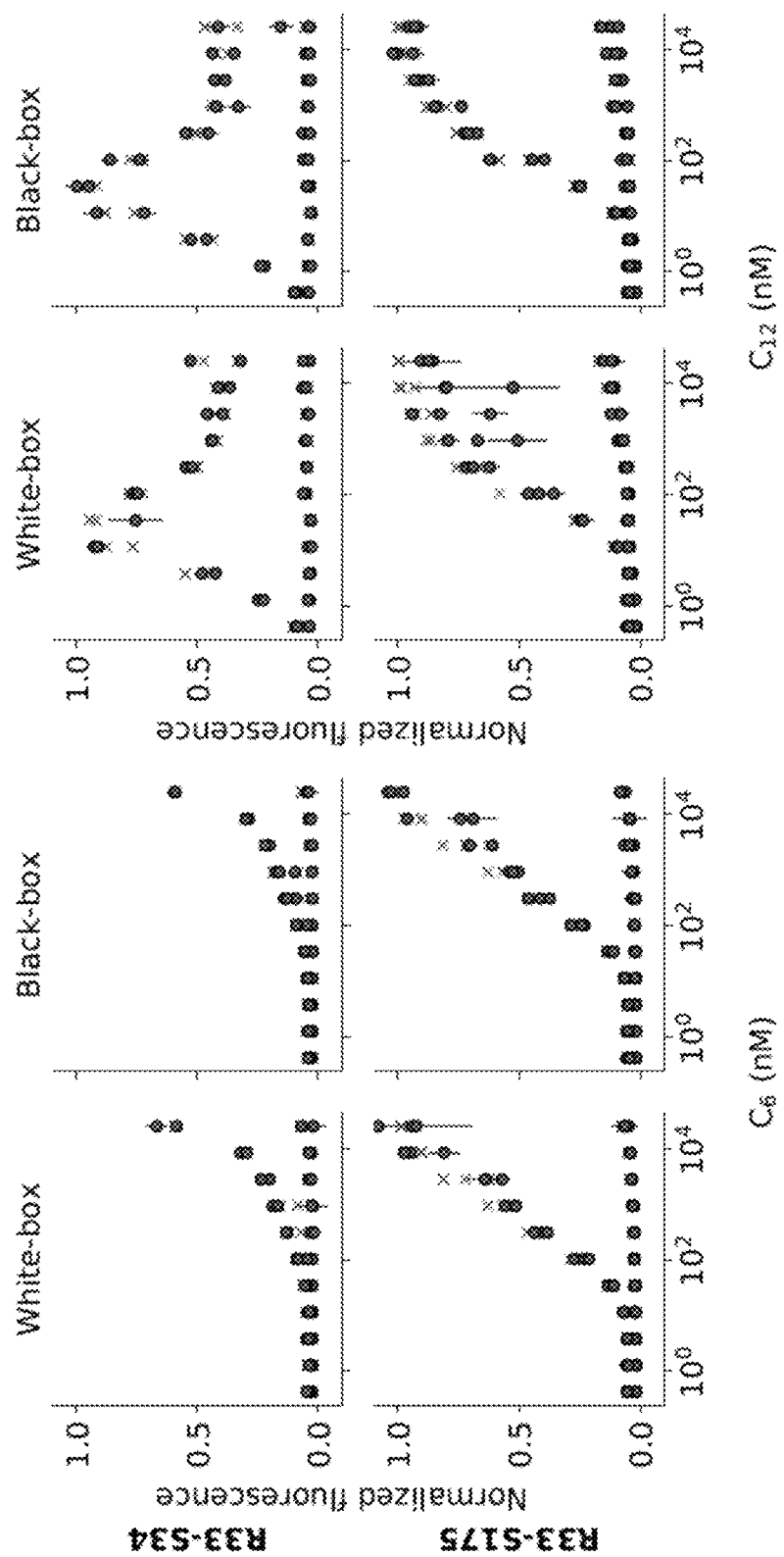
FIG. 5 is an example predicted model response to input signals in 4-fold cross validation inference.

FIG. 5 illustrates a predicted model response to input signals in 4-fold cross validation inference. To summarize how each model predicts the overall response of R33-S34 and R33-S175 to input signals, the posterior predictive distribution is shown at the final time-point (circle with error bars denoting two standard deviations), compared against the data point (crosses) for YFP and CFP.

FIG. 6 shows a predicted model response to input signals in held-out device inference. To summarize how each model predicts the overall response of R33-S34 (the held-out device) to input signals, the posterior predictive distribution is shown at the final time-point (circle with error bars denoting two standard deviations), compared against the data point (crosses) for YFP and CFP.

Traditional ODE Inference

Markov-Chain Monte Carlo (MCMC) methods are well understood in the context of time series models.

Likelihood-free (aka approximate Bayesian computation (ABC)) methods provide alternative inference framework that can be applied to dynamical systems. By taking advantage of fast forward simulations and approximate likelihoods based on comparing summarizing statistics of simulations and observations, ABC can avoid computing a potentially costly or intractable likelihood functions. Although analytic likelihoods are available for ODEs, Sequential Monte Carlo (SMC) ABC can be applied to ODE inference by simulating a discretized dynamical system with Runge-Kutta. A Runge-Kutta simulation may be applied, but an explicit likelihood and variational inference without SMC may be used to take advantage of fast, gradient-based optimization.

MCMC, ABC, and related methods apply numerical integration for parameter learning since the loss function involves an expectation. Gradient matching is a learning algorithm that avoid numerical integration by instead engaging in Gaussian process regression to the state variables of the dynamical system and minimizing the difference between Such inference is called "grid free" because it does not require discretization. Poor discretization of a dynamical system can lead to incorrect parameter estimates if, e.g., the underlying function is more complex than the maximum complexity that the chosen points of discretization can represent. A gradient matching algorithm that applies mean-field variational inference to discover moments of the population distribution in order to fit a GP that matches them may be used.

Variational inference for Other Dynamical Systems

Latent-variable time series models are among the most heavily used tools from statistics and machine learning. Stochastic variational inference may be applied to particular classes of dynamical models, mostly in the Kalman filter family.

Examples may apply stochastic variational inference to state-space models. The goal is identify a filtering distribution $p(\theta_{t+1}|\theta_{1:t})$ and smoothing distribution $p(\theta_t|x_{1:t})$ for the latent variables. A block-tridiagonal Gaussian variational may be chosen to approximate posterior family, inspired by linear dynamical systems (LDS's). The goal of previous methods is to reduce the dimension of the input space down to an interpretable, visualizable two-dimensional random variable. Compression induces a loss of information. Previous methods generalize linear dynamical systems, and apply variational inference to learn the optimal parametric approximate posterior distribution for their task. Examples of the invention relate to a more general class of dynamical systems whose evolution can be described by a set of nonlinear ordinary differential equations. Rather than stacking all observations into a single input vector, 1D convolutions are applied to encode temporal correlations in the mean and covariance functions of a diagonal rather than tridiagonal Gaussian. Another key difference is that the model does not assume full state observability, so that, unlike previous models, hidden latent processes are also modelled that are captured implicitly by the system of differential equations but do not explicitly appear as terms in the final observation model.

Similarly, the prior art present Deep Kalman Filters with the goal of learning nonlinear latent-variable transition and observation models through stochastic variational inference, e.g. searching in the same family of models as a linear dynamical system shows that through stochastic variational inference, x arbitrarily complex transition dynamics and emission distributions may be learned. A key similarity to some embodiments is the mean and covariance functions of the approximate q distribution, which employs a recurrent neural networks to discover correlative structure between time points. In contrast, the recognition network is a deterministic function of a latent variable process on the parameters θ of an ODE.

Nevertheless, the use of an RNN to generate the parameters of a highly nonlinear Kalman filter is similar to but more constrained than the black-box model.

Variational inference in the general context of stochastic differential equations has been explored. An example ordinary differential equation used is the limit of a stochastic differential equation as the diffusion term approaches zero. Examples may also search within the mean-field Gaussian approximate posterior family to discover distributions that generate the parameters the SDE that simulate the data well.

The biggest difference between previous work and some embodiments described herein is the presence of an autoregressive component in their approximate posterior distribution for the evolution of states. In previous work, the approximate posterior factorizes into a component that determines the parameters for the SDE drift and diffusion matrices, and a component that describes the evolution of the latent process. The component that describes the latent process evolution is autoregressive, requiring a sequential evaluation for the log-density that includes a log-det Jacobian term to account for how the probability mass changes step to step.

Such a modelling choice mimics the functional form of the evolution of an SDE, but requires substantially more computation. By contrast, embodiments of the invention make use of an additional independence assumption for the log-density of the latent process. This is equivalent to using a mean-field Gaussian distribution to fit a more structured one. This uses much less computation, supporting the goal of fast iteration among different candidate models of a data-generating process. Indeed, previous works report convergence requiring a few hours for a synthetic dataset based on a Lotka-Volterra model, whereas examples of the invention converge in under 15 minutes on real-world samples.

A new perspective on residual networks, recurrent neural network decoders, normalizing flows and any other functions approximators that exhibit repeated composition has been proposed. In particular, it has been observed that, if the outputs of such functions look like discretized ODEs, then some continuous time function at some initial condition must have generated them. A variational distribution over the initial conditions may be learned for such a model, and then any off-the-shelf ODE solver used to simulate the system. When such compositional functions are deep networks, they can have huge numbers of parameters, and so it can be costly to compute the gradients directly through a Runga-Kutte simulation method. "Neural ordinary differential equations" instead apply the adjoint method Pontryagin (2018), a much more memory efficient algorithm.

Despite surface similarities, the modeling regime and motivations of the prior work is markedly different from embodiments of the invention in that a block-conditional variational distribution over the parameters of a system of ODEs (in the white box case) is learned, or over a hierarchical factorization of the latent variables (in the black box case, guided by domain expertise. The variational distribution learned is over the parameters of this system, rather than the latent state itself. By contrast, previous systems learn a variational distribution over the initial state of the latent time series, and then generate the solution using any off-the-shelf ODE solver. In embodiments, the initial state is irrelevant, as leveraging probabilistic structure in the variational distribution is applied to learn the simulation process more efficiently, by sharing statistical strength. In particular, each dimension of the variational distribution learned has a specified interpretation according to the mechanistic model of the data-generating process.

Neural Mixed-Effects Models (NMEMs), a novel class of Bayesian dynamical systems that support scientific modelling of physical phenomena, have been discussed and a method of training them through stochastic variational inference has been presented. The key strengths of NMEMs are as follows.

1. Specialize prior work on learning the parameters of a dynamical system though stochastic variational inference to a case extremely relevant to experimental scientists: statistical mixed effects models. Such models allow experimental conditions to vary differently between groups and among groups.
2. Support predictive generalization of learned to unseen experimental combinations (also called zero-shot learning).
3. Deploys a state-of-the-art gradient estimator, DReGS, that is more suitable than previous techniques for the case where a statistical model is misspecified. This is the expected situation when investigating different scientific hypotheses.
4. Support compositionality of inference where the learned approximate posterior informs the prior for future experiments, thereby implementing iteration between theory and practice at scale with deep learning and stochastic variational inference.
5. Allow large-grain inductive biases to be specified for models through the NMEM decoder neural network. In the case of synthetic biological circuits, this takes the form of two neural networks, one representing a growth and another representing a decay, that together induce a mass-action kinetics on the output of the ODEs. Inductive biases appropriate for other fields of physical science can be similarly specified within the right-hand sides of the ODEs.
6. Supports probabilistic generative design of biological circuits that optimally express some desired behaviours, like the fastest rate of gene expression. This takes the following form. Once the NMEM has been learned, an additional energy functional over the learned latent space of ODE parameters can be applied. The functional represents a certain target behaviour for the ODE. Exploiting fast differentiable parameter inference allows for a quick search within that space for the best combination of devices over the input to achieve the target behaviour.

These characteristics make NMEMs ideally suited to data-driven mathematical modelling done at scale, supporting fast iteration over white-, black-, and grey-box models of mechanistic physical phenomena. NMEMs support an extension of the crucial classical statistical methodology of model selection for simple regression to the case of highly non-linear mixed-effects models, parameterised by ODEs.

White-Box (Mechanistic)

The mechanistic model describes the time-evolution of the response of double receiver devices to HSL signals C6 and C12, vector u in (1). The latent variables x in (1) are the colony density c, the intracellular concentrations of each expressed protein (luxR, lasR, RFP, CFP, YFP) and variables for autofluorescence, which are modelled as concentration of intracellular material fluorescent at 480 nm (F480) and 530 nm (F530). A system of differential equations was derived from chemical reactions (Dalchau et al., 2019), but several assumptions were made to simplify the model, including the removal of mRNA species. This resulted in the following system of equations:

$$\frac{dc_i}{dt} = \gamma(c_i) \cdot c_i \tag{5a}$$

$$\frac{dR}{dt} = a_R - (d_R + \gamma(c))R \tag{5b}$$

$$\frac{dS}{dt} = a_S - (d_S + \gamma(c))S \tag{5c}$$

$$\frac{dRFP}{dt} = 1 - (d_{RFP} + \gamma(c)) \cdot RFP \tag{5d}$$

$$\frac{dCFP}{dt} = a_{CFP} \cdot f_{76}(C_6, C_{12}, R, S) - (d_{CFP} + \gamma(c)) \cdot CFP \tag{5e}$$

$$\frac{dYFP}{dt} = a_{YFP} \cdot f_{81}(C_6, C_{12}, R, S) - (d_{YFP} + \gamma(c)) \cdot YFP \tag{5f}$$

$$\frac{dF_{480}}{dt} = a_{480} - \gamma(c) \cdot F_{480} \tag{5g}$$

$$\frac{dF_{530}}{dt} = a_{530} - \gamma(c) \cdot F_{530} \tag{5h}$$

which are explained in the following paragraphs.

As there are no mRNA species, the variables $a_k$ describe a lumped maximal rate of transcription and translation. The variables $d_k$ describe the intracellular degradation rates of each protein.

The response functions $f_{76}$ and $f_{81}$ describe the inducibility of CFP and YFP to complexes involving the HSL signals and the receiver proteins luxR and lasR. The response functions were derived from chemical reactions, making the assumption that signal-receiver binding and unbinding is faster than protein synthesis and degradation. This results in very complex functions, but they are still interpretable as exhibiting saturation behaviour, which occurs as either receiver proteins or promoters become limiting. Let $B_{LuxR}^{(k)}$ and $B_{LasR}^{(k)}$ define the fractions of luxR and lasR proteins bound by an HSL signal:

$$B_{LuxR}^{(k)} = \frac{(K_{R6} \cdot C_6)^{n_R} + (K_{R12} \cdot C_{12})^{n_R}}{(1 + K_{R6} \cdot C_6 + K_{R12} \cdot C_{12})^{n_R}} \tag{6a}$$

$$B_{LasR}^{(k)} = \frac{(K_{S6} \cdot C_6)^{n_S} + (K_{S12} \cdot C_{12})^{n_S}}{(1 + K_{S6} * C_6 + K_{S12} * C_{12})^{n_S}} \tag{6b}$$

These functions are bounded above by 1, which occurs when luxR/lasR become limiting. The CFP or YFP genes are transcribed more efficiently when their promoters are bound by one of the receiver-signal complexes. As such, an additional saturation can be observed within the derived forms $$f_j(R, S, C_6, C_{12}) = \frac{\varepsilon^{(j)} + K_{GR}^{(j)} R^2 B_{luxR} + K_{GS}^{(j)} S^2 B_{lasR}}{1 + K_{GR}^{(j)} R^2 B_{luxR} + K_{GS}^{(j)} S^2 B_{lasR}}$$

where $j \in \{76, 81\}$. Here, the parameters $K_{GR}^{(j)}$ and $K_{GS}^{(j)}$ are the affinity constants of receiver-signal complexes for each promoter j, and $\varepsilon^{(j)}$ is the leaky rate of transcription/translation in the absence of an activating complex (such as when there is no HSL).

The specific growth rate $\gamma(c_i)$ describes the per-capita cellular growth rate of colony i. Colonies are subscripted in this way because their growth parameters will be local to the colony, which enables implicit accounting for feedback from circuit activity or extrinsic factors that vary in different experiments. A lag-logistic growth model is used which explicitly quantifies a lag phase of bacterial growth before an exponential phase and then stationary phase. This is usually formulated as:

$$\gamma(c_i) = \begin{cases} r_i \cdot \left(1 - \frac{c}{K_i}\right) & t > t_{lag,i} \\ 0 & t < t_{lag,i} \end{cases}$$

but to ensure that the right-hand sides of f are differentiable, the switch at $t_{lag,i}$ is replaced with a steep sigmoid:

$$\gamma(c_i) = r_i \cdot \left(1 - \frac{c}{K_i}\right) \cdot \frac{1}{1 + e^{-4(t - t_{lag,i})}}$$

Finally, the application of this model may be applied to multiple devices, in which different ribosome-binding site sequences have been used for the LuxR and LasR genes (Section 3). In this mechanistic model, it is the parameters $a_R$ and $a_S$ that are allowed to be device-conditioned. Therefore, using the one-hot mapping strategy for specifying the rbs elements in each device, the model can take on device-specific quantities for LuxR and LasR synthesis.

Observer Process

The observer process is mentioned in the above and is described by a function g(x). Here, g represents the combination of optical density (OD) measurements of the colony, and bulk fluorescence measurements at a specified wavelength. For OD, the model of cell density directly can be compared directly. No scale factor is needed explicitly, as the lag-logistic equation above can be arbitrarily rescaled by adjusting the parameter $K_i$. For the bulk fluorescence measurements corresponding to RFP, CFP and YFP, the measure of cell number ($c_i$) is multiplied by the modelled intracellular concentration of each protein, followed by adding on the contribution from autofluorescence. In summary:

OD=c

Bulk RFP=c×RFP

Bulk CFP=c×(CFP+$F_{480}$)

Bulk YFP=c×(YFP+$F_{530}$)

Here, background fluorescence was essentially removed during data pre-processing, as a constant offset was subtracted.

Encoder Architecture

The parameters $\phi_{local}$ consist of real scalar functions m and s such that $$q_{\phi_{local}}^{(i)} = \mathcal{N}(m(y,u,o;\xi_i), s(y,u,o;\eta_i))$$

The m and s functions have the following form. In the following explication, take y and u to be arbitrary but particular samples from the true data-generating distribution.

A 1D strided CNN is first applied to the input y s·t·ỹ=flatten(AvgPool(ReLU(y*$W_1$))), where the convolution filter $W_1$ is chosen so that y*$W_1$ has one output channel. Note that the width of the convolution filter influences the correlation structure that can be discovered in the time series, acting as a window across the sequence. This stage in the computational pipeline is designed for feature learning.

Next, ỹ, u, and o are concatenated as inputs to an MLP with tanh nonlinearity and no bias term, that is, h=tanh($W_2$·[ỹ; u; o]). The composition of the two stages is a differentiable map m:=h∘ỹ s·$\mathbb{R}^{4T+n_u+n_d} \to \mathbb{R}$, yielding a mean for the learned posterior distribution over that parameter of the ODE.

The s function is identical to the m function but with different parameters, and it further exponentiates the output of the MLP. This last mapping is equivalent to interpreting the unconstrained output of the second neural network as the log of the standard deviation. The final step for m ensures that the resulting covariance matrix of the diagonal Gaussian is PSD. Each layer of $m^{(i)}$ and $s^{(i)}$ is L2-regularized using independent constants $\lambda_j^i$ to counter overfitting during learning.

Over minibatch learning, the network parameters that map data and conditioning information to means and log standard deviations are adapted through gradient descent, achieving amortization and supporting generalization.

The parameters $\phi_{local}$ are independent of the input data, and are real scalars r and v such that $$q_{\phi_{global}}^{(i)} = \mathcal{N}(r_i, \exp\{v_i\})$$

that is, $v_i$ is optimized in an unconstrained space interpreting, it as the log standard deviation. The variables $r_i$ and $v_i$ are initialized to the prior, and then optimized through gradient descent to maximize the ELBO.

The previous was set in consultation with the domain experts who designed and conducted the experiments, collected the data, and defined the system of differential equations to capture reasonable upper and lower ranges of the parameters of interest. This could also have been achieved by empirical Bayes or Type-II Maximum Likelihood, which involves learning a hyperprior over the prior parameters.

Each $q_{\phi_{global}}^{(i)}$ a 1D Gaussian or Log Normal (e.g., its output is exponentiated) depending on whether the term it represents in the ODE is a strictly positive real-world quantity or it represents any real value.

It will be appreciated that the above embodiments have been described by way of example only.

For instance, the disclosed techniques are not limited to the above-described application of modelling a genetic circuit. They can also be used to model any dynamic (time-varying) effect produced by any subject under conditions of different variants of that subject and/or different external signals applied to the subject. E.g. this may also be applicable to modelling the rates of growth of human, animal or plant populations; modelling of the rates of chemical reactions, or modelling of time varying meteorological phenomena. Further, the encoder is not limited to encoding the input observations into a latent vector that parameterizes the specific local q-distribution or distributions described above, and more generally may encode into a latent vector compressing the input data into a form representing any distribution in accordance with the principles of a variational autoencoder. Further, the encoder is not limited to including the device dependent q-distribution $q_D$ nor the global q-distribution $q_G$. In embodiments the encoder may produce only a vector describing a local distribution, or a larger vector comprising this and one or more additional fields describing one or both of a device-dependent or global distribution. At the decoder side, the decoder is not limited to being a function of both device (or subject) d and treatment(s) (or external signal) u. In embodiments it may take into account either or both of these in order to model the rate of change in the quantity under observation under conditions of different variants and/or external signals. Further, the decoder may employ a black box, grey box or white box approach.

Hence more generally, according to one aspect disclosed herein there is provided computer-implemented method comprising: from each of multiple trials, obtaining a respective series of observations y(t) of a subject over time t; using a variational auto encoder to model an ordinary differential equation, ODE, wherein the variational auto encoder comprises an encoder for encoding the observations into a latent vector z and a decoder for decoding the latent vector, the encoder comprising at least a first neural network and the decoder comprising one or more second neural networks, wherein the ODE as modelled by the decoder has a state x(t) representing one or more physical properties of the subject which result in the observations y, and the decoder models a rate of change of x with respect to time t as a function f of at least x and z: dx/dt=f(x, z); and operating the variational auto encoder to learn the function f based on the obtained observations y by tuning weights of the first and second neural networks, the learning comprising performing variational inference over the latent vector z, whereby z has a plurality dimensions and in the encoder each dimension is constrained to comprising one or more samples of a predetermined type of probabilistic distribution parameterized by a respective one or more parameters.

In embodiments at least some of the parameters in at least some dimensions of z may be learned as part of the learning.

In embodiments, said learning may comprise minimizing a measure of difference between the observations y and corresponding output values ŷ, the output values ŷ being predicted versions of the corresponding observations y related to the decoder state x by ŷ=g(x), where g is a predetermined observation function estimating a relation between the observations and said one or more properties.

In embodiments, the multiple trials may comprise trials under conditions of different variants d of the subject and/or different external signals u applied to the subject, where f is further modelled as a function of one or both of d and u: dx/dt=f(x, z, d), dx/dt=f(x, z, u) or dx/dt=f(x, z, d, u).

In embodiments, the method may comprise, following said learning, either: a) for a given candidate variant d, external signal u or combination thereof, predicting what the time profile of x or y would be caused by the given u and/or d; or b) for a desired time profile of x or y, inferring what variant d, external signal u or combination thereof would cause the desired time profile.

In embodiments, the method may comprise implementing a further instance of the subject with the predicted or inferred u and/or d.

In embodiment the decoder function predicts the rate of change of x with respect to time as a function of at least x, z, d and u: dx/dt=f(x, z, d, u).

In embodiments the method may comprise, following said learning, either: a) for a given candidate combination of variant d and external signal u, predicting what the time profile of x or y would be caused by the given d and u; or b) for a desired time profile of x or y, inferring what combination of variant d and external signal u would cause the desired time profile.

In embodiments the method may comprise implementing a further instance of the subject with the predicted or inferred u and d.

In embodiments, the state vector x is a state vector of at least one of the one or more second neural networks in the decoder.

In embodiments, the distributions from which at least some of the dimensions of z are sampled may be dependent on x.

In embodiments, the latent vector z generated by the encoder may comprise at least a local vector encoded from the observations y by the first neural network, each dimension of the local vector comprising one or more samples of a first, local probabilistic distribution which represents a variation per observation, the local probabilistic distribution being dependent on x and d.

In embodiments, the latent vector z may further comprise a device-dependent vector, each dimension of the device-dependent vector comprising one or more samples of a second, device-dependent probabilistic distribution which represents a variation in the observations per device, the device-dependent distribution being dependent on d but not x. In embodiments the latent vector z may further comprises a global vector, each dimension of the global vector comprising one or more samples of a third, global probabilistic distribution which represents a global variation in the observations, the global distribution being dependent on neither d nor x.

In embodiments, the function f may be modelled in the decoder in the form of a known analytical equation for estimating the production of said quantity, the equation comprising a plurality of parts; and wherein the one or more second neural networks comprise a plurality of second neural networks, each of said parts being modelled by at least a respective one of the second neural networks.

In embodiments, said form may comprise $dx/dt = f_1 - x \cdot f_2$, where each of $f_1$ and $f_2$ comprises at least a respective one of the second neural networks, and each is a function of x and z and optionally one or both of d and u.

In embodiments, the subject is a device of a genetic circuit inserted into a cell for producing one or more proteins, the device comprising one or more cassettes each comprising at least one respective gene and at least one respective promoter; wherein the one or more properties comprises one or more of: —a density of copies of the cell in a population from which the observations are observed in the respective trial, and—an intercellular concentration of any one or more proteins or other species between cells in the population from which the observations are observed in the respective trial.

In embodiments, the one or more proteins may comprises a florescent reporter protein and the observations comprises a measure of an amount of light received from the fluorescent protein.

In embodiments, the variants d of the device may comprise different cassettes or different combinations of cassettes.

In embodiments, the different external signals u may comprise one or more different treatments or combinations of treatments applied to the device.

In embodiments, the method may comprise, following said learning, either: a) for a given candidate variant of the device d, treatment or treatments u, or combination of device d and treatment or treatments u, predicting what time profile of x or y would be caused by the candidate device, treatment or treatments, or combination; or b) for a desired time profile of x or y, inferring what device d, treatment or treatments u, or combination of device d and treatment or treatments u, would cause the desired time profile.

In embodiments, the method may comprise, in vitro, engineering a genetic circuit including the candidate or inferred device d in a cell, and thereby causing the cell to produce said one or more proteins with the predicted or desired time profile, respectively. In embodiments, the method may comprise, in vitro, engineering a genetic circuit including the device in a cell, applying the candidate or inferred treatment or treatments to the device, and thereby causing the cell to produce said one or more proteins with the predicted or desired time profile, respectively. In embodiments, the method may comprise, in vitro, engineering a genetic circuit including the candidate or inferred device d in a cell, applying the candidate or inferred treatment or treatments to the device, and thereby causing the cell to produce said one or more proteins with the predicted or desired time profile, respectively. In embodiments, the method may comprise, in vitro, engineering a genetic circuit including in a cell a further device approximated by the candidate or inferred device, and thereby causing the cell to produce at least one protein resulting from the further device. In embodiments, the method may comprise, in vitro, engineering a genetic circuit including in a cell a further device approximated by the device, and applying the candidate or inferred treatment or treatments to the device, thereby causing the cell to produce at least one protein resulting from the further device. In embodiments the method may comprise, in vitro, engineering a genetic circuit including in a cell a further device approximated by the candidate or inferred device d, applying the candidate or inferred treatment or treatments to the device, and thereby causing the cell to produce at least one protein resulting from the further device.

According to another aspect disclosed herein, there is provided a computer program embodied on computer-readable storage and configured so as when run on a computer to perform operations in accordance with any method disclosed herein.

According to another aspect, there is provided computer system comprising storage and one or more processors, the storage storing code arranged to run on at least one of the processors, wherein the code is configured so as when run on the at least one processor to perform operations in accordance with any of the methods disclosed herein.

According to another aspect, there is provided an engineering facility comprising: the computer system arranged to run said computer program; and in vitro genetic engineering equipment arranged, based on the running of the program, to perform said production of a genetic circuit.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method comprising:
from each of multiple trials, obtaining a respective series of observations y(t) of a subject over time t;
using a variational auto encoder to model an ordinary differential equation, ODE, wherein the variational auto encoder comprises an encoder for encoding the observations into a latent vector z and a decoder for decoding the latent vector, the encoder comprising at least a first neural network and the decoder comprising one or more second neural networks, wherein the ODE as modelled by the decoder has a state x(t) representing one or more physical properties of the subject which result in the observations y, and the decoder models a rate of change of x with respect to time t as a function f of at least x and z: $dx/dt = f(x, z)$; and
operating the variational auto encoder to learn the function f based on the obtained observations y by tuning weights of the first and second neural networks, the learning comprising performing variational inference over the latent vector z, whereby z has a plurality of dimensions and in the encoder each dimension is constrained to comprising one or more samples of a predetermined type of probabilistic distribution parameterized by a respective one or more parameters.

2. The method of claim 1, wherein said learning comprises minimizing a measure of difference between the observations y and corresponding output values $\hat{y}$, the output values $\hat{y}$ being predicted versions of the corresponding observations y related to the decoder state x by $\hat{y}=g(x)$, where g is a predetermined observation function estimating a relation between the observations and said one or more properties.

3. The method of claim 1, wherein the multiple trials comprise trials under conditions of different variants d of the subject and/or different external signals u applied to the subject, where f is further modelled as a function of one or both of d and u:

$$dx/dt=f(x,z,d), dx/dt=f(x,z,u) \text{ or } dx/dt=f(x,z,d,u).$$

4. The method of claim 3, comprising, following said learning, either:
 a) for a given candidate variant d, external signal u or combination thereof, predicting what the time profile of x or y would be caused by the given u and/or d; or
 b) for a desired time profile of x or y, inferring what variant d, external signal u or combination thereof would cause the desired time profile.

5. The method of claim 4, comprising implementing a copy of the subject with the predicted or inferred u and/or d.

6. The method of claim 1, wherein the state vector x is a state vector of at least one of the one or more second neural networks in the decoder.

7. The method of claim 1, wherein the distributions from which at least some of the dimensions of z are sampled are dependent on x.

8. The method of claim 1, wherein:
 the latent vector z generated by the encoder comprises at least a local vector encoded from the observations y by the first neural network, each dimension of the local vector comprising one or more samples of a first predetermined type of a probabilistic distribution which represents a variation per observation, the local probabilistic distribution being dependent on x and d.

9. The method of claim 8, wherein:
 the latent vector z further comprises a device-dependent vector, each dimension of the device-dependent vector comprising one or more samples of a second predetermined type of a probabilistic distribution which represents a variation in the observations per device, the second predetermined type of the probabilistic distribution being a device-dependent distribution and dependent on d but not x; and/or
 the latent vector z further comprises a global vector, each dimension of the global vector comprising one or more samples of a third predetermined type of a probabilistic distribution which represents a global variation in the observations, the third predetermined type of the probabilistic distribution being a global distribution being dependent on neither d nor x.

10. The method of claim 1, wherein in the decoder, the function f is modelled in the form of a known analytical equation, the equation comprising a plurality of parts; and wherein the one or more second neural networks comprise a plurality of second neural networks, each of said parts being modelled by at least a respective one of the second neural networks.

11. The method of claim 10, wherein said form comprises $dx/dt=f_1-x \cdot f_2$, where each of $f_1$ and $f_2$ are modeled as at least a respective one of the second neural networks, and each is a function of x and z and optionally one or both of d and u.

12. The method of claim 1, wherein the subject comprises a device of a genetic circuit inserted into a cell for producing one or more proteins, the device comprising one or more cassettes each comprising at least one respective gene and at least one respective promoter; and wherein the one or more properties comprises one or more of:
 a density of copies of the cell in a population from which the observations are observed in the respective trial, and/or
 an intercellular concentration of any one or more proteins or other species between cells in the population from which the observations are observed in the respective trial.

13. The method of claim 12, wherein the one or more proteins comprises a florescent reporter protein and the observations comprises a measure of an amount of light received from the fluorescent protein.

14. The method of claim 12, wherein:
 the multiple trials comprise trials under conditions of different variants d of the device and/or different external signals u applied to the device, where f is further modelled as a function of one or both of d and u: $dx/dt=f(x,z,d)$, $dx/dt=f(x,z,u)$ or $dx/dt=f(x,z,d,u)$; and
 the variants d of the device comprise different cassettes or different combinations of cassettes.

15. The method of claim 12, wherein:
 the multiple trials comprise trials under conditions of different variants d of the device and/or different external signals u applied to the devices, where f is further modelled as a function of one or both of d and u: $dx/dt=f(x,z,d)$, $dx/dt=f(x,z,u)$ or $dx/dt=f(x,z,d,u)$; and
 the different external signals u comprise one or more different treatments or combinations of treatments applied to the device.

16. The method of claim 12, wherein:
 the multiple trials comprise trials under conditions of different variants d of the device and/or different external signals u applied to the device, where f is further modelled as a function of one or both of d and u: $dx/dt=f(x,z,d)$, $dx/dt=f(x,z,u)$ or $dx/dt=f(x,z,d,u)$;
 the variants d of the device comprise different cassettes or different combinations of cassette, and/or the different external signals u comprise one or more different treatments or combinations of treatments applied to the device; and
 the method comprises, following said learning, either:
 a) for a given candidate of the variants d of the device, treatment or treatments u, or combination of the variants d of the device and treatment or treatments u, predicting what time profile of x or y would be caused by the candidate of the variants d of the device, treatment or treatments, or combination; or
 b) for a desired time profile of x or y, inferring what the variants d of the device, treatment or treatments u, or combination of the variants d of the device and treatment or treatments u, would cause the desired time profile.

17. The method of claim 16, comprising, in vitro:
 engineering a genetic circuit including the candidate or the inferred variants of the device in a cell, and thereby causing the cell to produce said one or more proteins with the predicted or desired time profile, respectively;

engineering a genetic circuit including the variants d of the device in a cell, applying the candidate or inferred treatment or treatments to the variants d of the device, and thereby causing the cell to produce said one or more proteins with the predicted or desired time profile, respectively;

engineering a genetic circuit including the candidate or the inferred variants d of the device in a cell, applying the candidate or inferred treatment or treatments to the variants d of the device, and thereby causing the cell to produce said one or more proteins with the predicted or desired time profile, respectively;

engineering a genetic circuit including in a cell a first additional device approximated by the candidate or inferred variants d of the device, and thereby causing the cell to produce at least one protein resulting from the first additional device;

engineering a genetic circuit including in a cell a second additional device approximated by the variants d of the device, and applying the candidate or inferred treatment or treatments to the variants d of the device, thereby causing the cell to produce at least one protein resulting from the second additional device; or engineering a genetic circuit including in a cell a third additional approximated by the candidate or the inferred variants d of the device, applying the candidate or inferred treatment or treatments to the variants d of the device, and thereby causing the cell to produce at least one protein resulting from the third additional device.

18. A computer program on a memory of a computer and configured so as when run on the computer to perform the method of claim 1.

19. A computer system comprising storage and one or more processors, the storage storing code arranged to run on at least one of the processors, wherein the code is configured so as when run on the at least one processor to perform operations of:

from each of multiple trials, obtaining a respective series of observations y(t) of a subject over time t;

implementing a variational auto encoder to model an ordinary differential equation, ODE, wherein the variational auto encoder comprises an encoder for encoding the observations into a latent vector z and a decoder for decoding the latent vector, the encoder comprising at least a first neural network and the decoder comprising one or more second neural networks, wherein the ODE as modelled by the decoder has a state x(t) representing one or more physical properties of the subject which result in the observations y, and the decoder models a rate of change of x with respect to time t as a function f of at least x and z: dx/dt=f(x, z); and operating the variational auto encoder to learn the function f based on the obtained observations y by tuning weights of the first and second neural networks, the learning comprising performing variational inference over the latent vector z, whereby z has a plurality of dimensions and in the encoder each dimension is constrained to comprising one or more samples of a predetermined type of probabilistic distribution parameterized by a respective one or more parameters.

20. A genetic engineering facility comprising:

a computer system comprising storage and one or more processors, the storage storing code arranged to run on at least one of the processors, wherein the code is configured so as when run on the at least one processor to perform operations of:

from each of multiple trials, obtaining a respective series of observations y(t) of a subject over time t;

implementing a variational auto encoder to model an ordinary differential equation, ODE, wherein the variational auto encoder comprises an encoder for encoding the observations into a latent vector z and a decoder for decoding the latent vector, the encoder comprising at least a first neural network and the decoder comprising one or more second neural networks, wherein the ODE as modelled by the decoder has a state x(t) representing one or more physical properties of the subject which result in the observations y, and the decoder models a rate of change of x with respect to time t as a function f of at least x and z: dx/dt=f(x, z); and operating the variational auto encoder to learn the function f based on the obtained observations y by tuning weights of the first and second neural networks, the learning comprising performing variational inference over the latent vector z, whereby z has a plurality of dimensions and in the encoder each dimension is constrained to comprising one or more samples of a predetermined type of probabilistic distribution parameterized by a respective one or more parameters;

wherein the subject comprises a device of a genetic circuit inserted into a cell for producing one or more proteins, the device comprising one or more cassettes each comprising at least one respective gene and at least one respective promoter; and wherein the one or more properties comprises one or more of: a density of copies of the cell in a population from which the observations are observed in the respective trial, and/or an intercellular concentration of any one or more proteins or other species between cells in the population from which the observations are observed in the respective trial;

wherein the multiple trials comprise trials under conditions of different variants d of the device and/or different external signals u applied to the device, where f is further modelled as a function of one or both of d and u: dx/dt=f(x,z,d), dx/dt=f(x,z,u) or dx/dt=f(x,z,d,u), the variants d of the device comprising different cassettes or different combinations of cassette, and/or the different external signals u comprising one or more different treatments or combinations of treatments applied to the device; and wherein the code is further configured so as, following said learning, to either:

a) for a given candidate variant of a device d, treatment or treatments u applied to the device, or combination of the variant of the device d and treatment or treatments u, predicting what time profile of x or y would be caused by the candidate device, treatment or treatments, or combination; or b) for a desired time profile of x or y, inferring what the variant of the device d, treatment or treatments u, or combination of the variant of the device d and treatment or treatments u, would cause the desired time profile;

wherein the genetic engineering facility further comprises in vitro genetic engineering equipment arranged to produce a genetic circuit based on the running of the program, the production comprising:

engineering a genetic circuit including the candidate or the inferred variant of the device d in a cell, and thereby causing the cell to produce said one or more proteins with the predicted or desired time profile, respectively;

engineering a genetic circuit including the variant of the device d in a cell, applying the candidate or inferred treatment or treatments to the device, and thereby causing the cell to produce said one or more proteins with the predicted or desired time profile, respectively;

engineering a genetic circuit including the candidate or the inferred variant of the device d in a cell, applying the candidate or inferred treatment or treatments to the variant of the device d, and thereby causing the cell to produce said one or more proteins with the predicted or desired time profile, respectively;

engineering a genetic circuit including in a cell a first additional device approximated by the candidate or inferred variant of the device d, and thereby causing the cell to produce at least one protein resulting from the first additional device;

engineering a genetic circuit including in a cell a second additional device approximated by the variant of the device d, and applying the candidate or inferred treatment or treatments to the variant of the device d, thereby causing the cell to produce at least one protein resulting from the second additional device; or engineering a genetic circuit including in a cell a third additional device approximated by the candidate or the inferred variant of the device d, applying the candidate or inferred treatment or treatments to the variant of the device d, and thereby causing the cell to produce at least one protein resulting from the third additional device.

* * * * *